(12) United States Patent
Suto et al.

(10) Patent No.: US 7,586,534 B2
(45) Date of Patent: Sep. 8, 2009

(54) MULTI-EYE IMAGE PICKUP DEVICE, ADJUSTING METHOD AND DEVICE THEREFOR, AND IMAGE-AREA ADJUSTING SYSTEM AND METHOD

(75) Inventors: Norihisa Suto, Saitama (JP); Satoshi Nakamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 593 days.

(21) Appl. No.: 11/377,577

(22) Filed: Mar. 17, 2006

(65) Prior Publication Data

US 2006/0215021 A1 Sep. 28, 2006

(30) Foreign Application Priority Data

Mar. 22, 2005 (JP) ............................. 2005-082625
Mar. 30, 2005 (JP) ............................. 2005-099207

(51) Int. Cl.
H04N 5/222 (2006.01)
H04N 13/00 (2006.01)
H04N 9/47 (2006.01)
H04N 5/225 (2006.01)

(52) U.S. Cl. ................... 348/333.09; 348/42; 348/139; 348/335

(58) Field of Classification Search ............. 348/42–44, 348/47, 139, 207.1, 207.2, 333.09, 335; 382/154, 382/291, 419

See application file for complete search history.

(56) References Cited

U.S. PATENT DOCUMENTS 6,549,650 B1 * 4/2003 Ishikawa et al. ............ 382/154
2003/0206653 A1 * 11/2003 Katayama et al. ........... 382/154
2005/0089212 A1 * 4/2005 Mashitani et al. ........... 382/154
2005/0195478 A1 * 9/2005 Yanagawa et al. ........... 359/462

FOREIGN PATENT DOCUMENTS

JP 8-317424 A 11/1996
JP 2001-242521 A 9/2001

* cited by examiner

*Primary Examiner*—Nhan T Tran
*Assistant Examiner*—Trung Diep
(74) *Attorney, Agent, or Firm*—Sughrue Mion, PLLC

(57) ABSTRACT

A multi-eye image pickup device includes a left-side optical unit and a right-side optical unit. At a time of adjustment, an adjustment target mark is located so as to be slightly shifted in a faraway direction relative to a subject position where a subject is shot. The adjustment target mark is taken by the respective optical units, and images taken thereby are analyzed to find a clip area of each optical unit. The clip area has a predetermined size and the center thereof is positioned at the image of the adjustment target mark. The respective clip areas are stored in a correction memory of the multi-eye image pickup device. At a time of subject shooting, an image of the stored clip area is clipped from a shooting image taken by each optical unit.

16 Claims, 19 Drawing Sheets

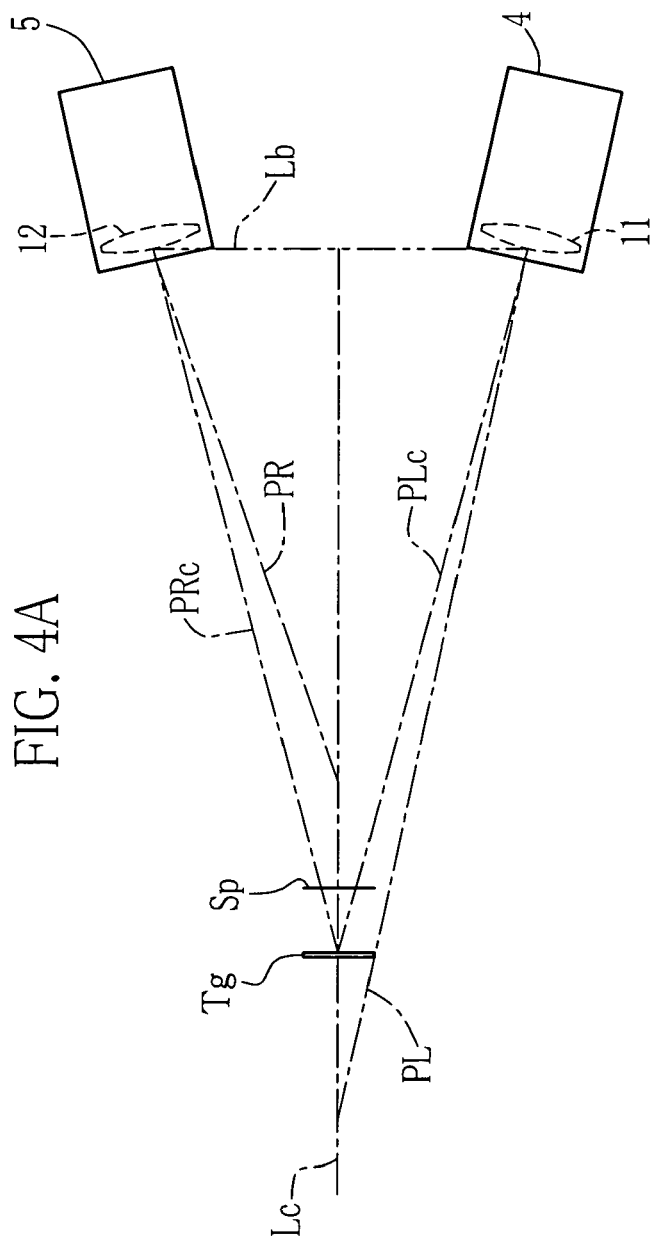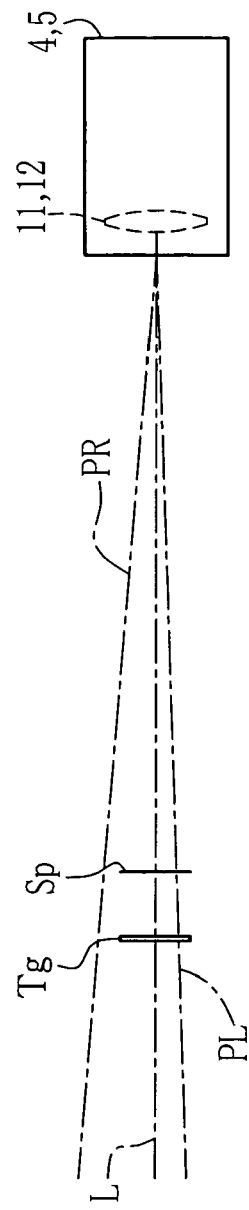

FIG. 7

|  | COORDINATE |
|---|---|
| LEFT-SIDE CLIP AREA | $(XL1, YL1)$ |
|  | $(XL2, YL1)$ |
|  | $(XL2, YL2)$ |
|  | $(XL1, YL2)$ |
| RIGHT-SIDE CLIP AREA | $(XR1, YR1)$ |
|  | $(XR2, YR1)$ |
|  | $(XR2, YR2)$ |
|  | $(XR1, YR2)$ |

FIG. 8

|  | COORDINATE |
|---|---|
| LEFT-SIDE CLIP CENTER | $(\Delta XL0, \Delta YL0)$ |
| RIGHT-SIDE CLIP CENTER | $(\Delta XR0, \Delta YR0)$ |

FIG. 10

|  | COORDINATE |
|---|---|
| LEFT-SIDE CLIP AREA | $(X_{L1}, Y_{L1})$ |
|  | $(X_{L2}, Y_{L2})$ |
|  | $(X_{L3}, Y_{L3})$ |
|  | $(X_{L4}, Y_{L4})$ |
| RIGHT-SIDE CLIP AREA | $(X_{R1}, Y_{R1})$ |
|  | $(X_{R2}, Y_{R2})$ |
|  | $(X_{R3}, Y_{R3})$ |
|  | $(X_{R4}, Y_{R4})$ |

FIG. 11

|  | COORDINATE |
|---|---|
| RIGHT-SIDE CLIP CENTER | $(\Delta X_{R0}, \Delta Y_{R0})$ |
| LEFT-SIDE CLIP CENTER | $(\Delta X_{L0}, \Delta Y_{L0})$ |
| LEFT-SIDE ROTATION ANGLE | $\Delta \theta L$ |
| RIGHT-SIDE ROTATION ANGLE | $\Delta \theta R$ |

MULTI-EYE IMAGE PICKUP DEVICE, ADJUSTING METHOD AND DEVICE THEREFOR, AND IMAGE-AREA ADJUSTING SYSTEM AND METHOD

BACKGROUND OF THE INVENTION

1. Field of the Invention

The present invention relates to a multi-eye image pickup device and adjusting method and device therefor, and further relates to a system and a method for adjusting image areas of imaging units of the multi-eye image pickup device.

2. Description of the Related Art

A multi-eye image pickup device is known. In this kind of the multi-eye image pickup device, two optical systems for shooting are disposed at a predetermined interval to take two images, which have parallax, with a CCD image sensor and so forth. By the multi-eye image pickup device, it is possible to obtain distance information of a subject in a depth direction. The distance information is utilized for high-accuracy image recognition in which a contour and so forth of the subject are considered. For example, two face images having parallax are taken by using the multi-eye image pickup device having a pair of optical systems, which are horizontally disposed. By performing person authentication on the basis of the taken face images, it is possible to utilize the multi-eye image pickup device as a security device for managing person entering and leaving a room in a condominium, a company and so forth.

In the multi-eye image pickup device, it is necessary to mutually adjust optical axes of the shooting optical systems with great accuracy. For instance, in the multi-eye image pickup device used as the security device, the optical axes of the shooting optical systems, which are horizontally disposed, are adjusted so as to make the optical axes intersect at a fixed point of a shooting length.

In the multi-eye image pickup device (stereoscopic image pickup device) described in Japanese Patent Laid-Open Publication No. 8-317424, each of shooting optical systems is loaded with a zoom-type taking lens. Regarding the respective optical systems, a shift amount of optical axes is measured and stored in advance relative to each focal length. At a time of shooting, the focal length of the taking lens is detected and a clip area of a taken image is controlled in accordance with the shift amount of the detected focal lengths. In virtue of this, the optical axes of the obtained images are prevented from shifting.

In the multi-eye image pickup device used as the security device, the optical axes of the respective shooting optical systems are adjusted so as to make the optical axes intersect at the fixed point of the shooting length. However, in a case that the subject is someone's face, the optical axes are adjusted so as to intersect at the center of both eyes similarly to a focal point. Thus, the center of both eyes of a crossly taken face becomes the center of a shooting area, so that images of a cheek, an ear and so forth located at a side portion of the face are biased to an end of the shooting area. In the worst case, there arises a problem in that these parts protrude out of the shooting area and it becomes impossible to perform the person authentication.

The above problem is similarly caused in a case that the image is clipped to correct the shift of the optical axes such as described in the above-noted Publication No. 8-317424. Incidentally, it is considerable that the shooting area and an image clip area are broadly set. In this case, however, there arises a problem in that extra image increases besides the image to be recognized. Due to this, it takes a longer time for recognition processing. Further, there arises another problem in that the image clip area might be larger than the shooting area.

In the meantime, Japanese Patent Laid-Open Publication No. 2001-242521 also teaches the multi-eye image pickup device (stereoscopic image pickup device). It is desirable that two images taken by the multi-eye image pickup device have no positional deviation except for the parallax. In fact, however, the deviation is caused within a range of mechanical attachment accuracy. In view of this, the stereoscopic image pickup device described in the above-noted Publication No. 2001-242521 includes three adjustment screws for supporting a circuit board to which a CCD is attached. An inclination and so forth of the circuit board are changed in accordance with insertion amounts of the adjustment screws to correct the positional deviation.

However, there arises a problem in that an adjusting operation of this case takes a lot of labor. In the adjusting operation, the images are confirmed and adjusted while the insertion amounts of the screws are changed little by little. Especially, in a case the stereoscopic image pickup device is used as an authentication camera and a security camera, it is likely to cause the positional deviation at a time of transportation thereof. Thus, it is preferable that the adjustment is performed just before attaching the stereoscopic image pickup device to a predetermined installation place of another equipment, a room and so forth. In order to simplifying the attachment operation as well, it is strongly desired that the positional deviation of the images can be more easily adjusted.

SUMMARY OF THE INVENTION

In view of the foregoing, it is a primary object of the present invention to provide a multi-eye image pickup device and an adjusting method therefor in which a subject is properly taken within a predetermined shooting area.

It is a second object of the present invention to provide image-area adjusting system and method in which an operation for adjusting positional deviation of images is simplified.

In order to achieve the above and other objects, the multi-eye image pickup device according to the present invention comprises a plurality of imaging optical systems, a case, an image clipper and a memory. The imaging optical system has a taking lens and an image sensor on which a subject image is formed by the taking lens. The case holds the imaging optical systems at a predetermined interval. The image clipper clips a portion, which corresponds to a clip area predetermined every shooting frame of the respective image sensors, from the shooting frame. The memory stores clip-position data representing a position of the clip area situated on the shooting frame. Preferably, the memory is a nonvolatile memory.

In a preferred embodiment, the clip-position data stored in the memory represents a region predetermined around a location, which corresponds to a reference point sifted in a far away direction relative to a predetermined subject position.

In another embodiment, the clip-position data stored in the memory represents a location, which corresponds to a reference point sifted in a faraway direction relative to a predetermined subject position. The image clipper clips the clip area around the location represented by the clip-position data.

It is preferable that the multi-eye image pickup device comprises a mechanism for adjusting the interval of the imaging optical systems.

The adjusting method for the multi-eye image pickup device comprises the steps of shooting a target, which is disposed so as to be shifted in the faraway direction relative to the predetermined subject position, by using the imaging optical systems, and measuring a position of the target located within the shooting frame, with respect to each of the imaging optical systems. The adjusting method further comprises the steps of determining either of the position of the target and the clip area whose center is the position of the target, and setting the determined position of the target and the determined clip area to the multi-eye image pickup device.

According to the present invention, clipping is performed for the image taken by each of the imaging optical systems under the condition that the clip center located within the shooting frame corresponds to the reference point shifted in the faraway direction relative to the predetermined subject position. Thus, it is possible to easily correct the shift of the optical axes of the imaging optical systems. In addition, it is possible to properly take a subject image having a depth, which is a someone's face and so forth, within a predetermined area in a state that extra image is reduced. Further, the clip area of the shot image is adapted to be rotated in accordance with a rotational shift amount of the shooting frame. Thus, it is possible to easily correct a rotational shift of the shooting frame around the optical axis of the taking lens.

The image-area adjusting system according to the present invention comprises the multi-eye image pickup device, a chart, an adjustment stage and an adjusting device. On the chart, an adjustment image is drawn for adjusting an image area of the imaging optical system. The adjusting stage moves the multi-eye image pickup device, which is fixed in a state that the imaging optical systems confront the adjustment image, in vertical and horizontal directions. Moreover, the adjustment stage rotates the multi-eye image pickup device around an axis extending toward the adjustment image. The adjustment stage makes an appropriate position, which is shifted from a central position of the clip area by parallax of the imaging optical systems, coincide with a reference position of the adjustment image with respect to the first imaging optical system. The adjusting device is capable of intercommunicating with the multi-eye image pickup device. The adjusting device recognizes the adjustment image from the shooting frame of the second imaging optical system to obtain reference-position data representing a deviation amount between the appropriate position of the second imaging optical system and the reference position of the adjustment image in a state that the appropriate position of the first imaging optical system coincides with the reference position of the adjustment image. Further, the adjusting device updates the clip-position data on the basis of the reference-position data so as to make the appropriate position of the second imaging optical system coincide with the reference position of the adjustment image. The adjusting device overwrites the updated clip-position data in the nonvolatile memory.

It is preferable that the multi-eye image pickup device includes a rotation-angle adjusting mechanism for adjusting a rotation angle of the image sensor around an optical axis thereof. Further, it is preferable that the adjustment stage includes a driver for driving the rotation-angle adjusting mechanism.

The image-area adjusting method according to the present invention comprises the steps of fixing the multi-eye image pickup device to the adjustment stage so as to confront the chart, and driving the adjustment stage to make the appropriate position coincide with the reference position of the adjustment image with respect to the first imaging optical system. Moreover, the image-area adjusting method comprises the steps of recognizing the adjustment image from the shooting frame of the second imaging optical system, and obtaining reference-position data, which represents a deviation amount between the appropriate position of the second imaging optical system and the reference position of the adjustment image. Further, the image-area adjusting method comprises the steps of updating the clip-position data on the basis of the reference-position data so as to make the appropriate position of the second imaging optical system coincide with the reference position of the adjustment image, and overwriting the updated clip-position data in the nonvolatile memory.

According to the present invention, the portion corresponding to the clip area is clipped from the shooting frame on the basis of the updated clip-position data so that the positional deviation except for the parallax is removed from the clipped portion. Since the clip-position data is automatically updated, it is possible to extremely simplify the adjusting operation in comparison with other method in which an insertion amount of a screw is changed little by little to carry out the adjusting operation.

BRIEF DESCRIPTION OF THE DRAWINGS

The above objects and advantages of the present invention will become apparent from the following detailed description of the preferred embodiments of the invention when read in conjunction with the accompanying drawings, in which:

FIGS. 4A and 4B are explanatory illustrations showing a shift of optical axes of optical units and a position of an adjustment target mark;

FIG. 7 is an explanatory illustration showing memory contents of a correction memory;

FIG. 8 is an explanatory illustration showing a case in that the correction memory stores clip centers;

FIG. 10 is an explanatory illustration showing memory contents of the correction memory in the case that the rotation around the optical axis of the shooting frame is corrected;

FIG. 11 is an explanatory illustration showing a case in that the correction memory stores clip centers and rotational shift around the optical axis of the shooting frame;

DETAILED DESCRIPTION OF THE PREFERRED EMBODIMENT(S)

Figure 1:
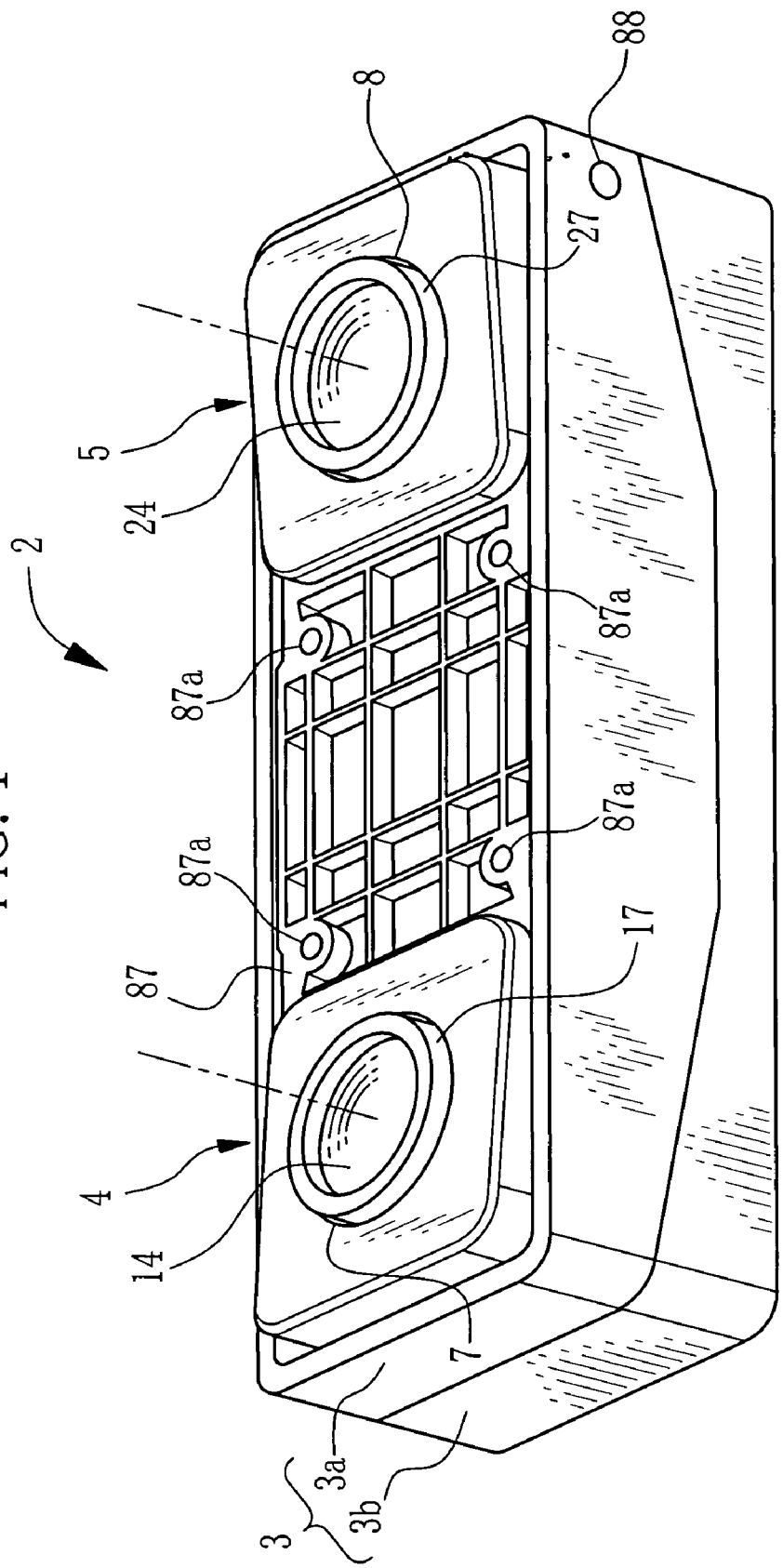
FIG. 1 is a perspective view showing a front side of a multi-eye image pickup device according to the present invention.
Figure 2:
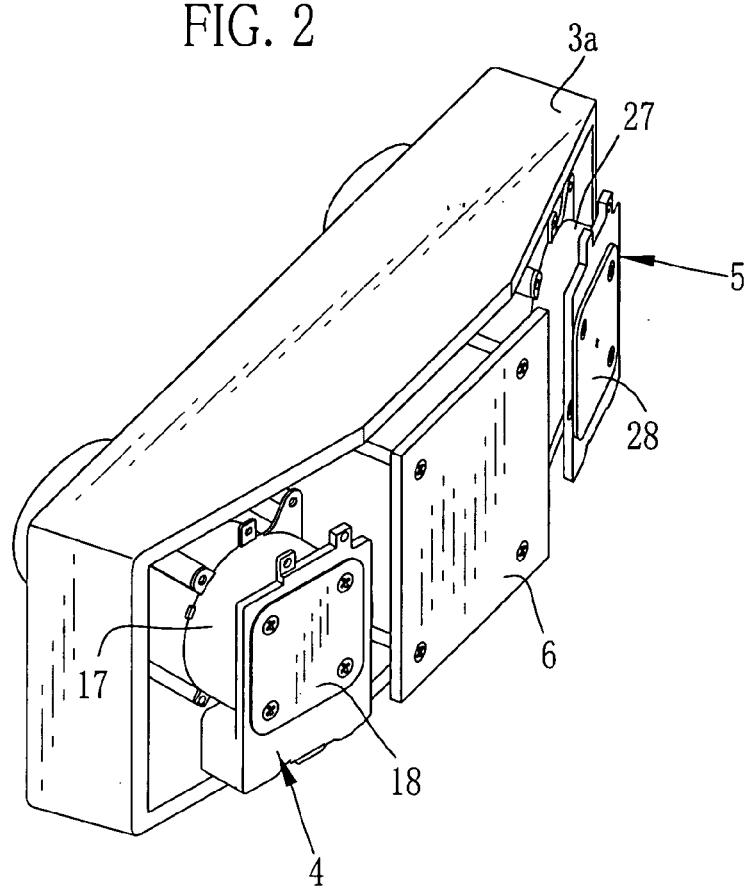
FIG. 2 is a perspective view showing a rear side of the multi-eye image pickup device of which a rear cover is detached.

The first embodiment of the present invention is described below. FIG. 1 shows a front side of a multi-eye image pickup device and FIG. 2 shows a rear side thereof in a state that a rear cover is detached. The multi-eye image pickup device 2 comprises a left-side optical unit 4, a right-side optical unit 5, various circuits and so forth, which are contained in a case 3 composed of a front cover 3a and a rear cover 3b. The respective optical units 4 and 5 are regarded as a shooting optical system and take a pair of subject images having parallax. In this embodiment, for example, a subject to be taken is someone's face.

As to the multi-eye image pickup device 2, the front cover 3a works as a chassis. The left-side optical unit 4, the right-side optical unit 5 and a circuit board 6, on which the various circuits are formed, are attached to the front cover 3a. An anterior side of the front cover 3a is provided with a pair of openings 7 and 8, which are horizontally formed at a predetermine interval. A taking lens 14 of the left-side optical unit 4 is exposed through the opening 7, and a taking lens 24 of the right-side optical unit 5 is exposed through the opening 8.

The respective optical units 4 and 5 are attached to the front cover 3a so as to face inwardly at a proper angle, in other words, so as to intersect optical axes of the optical units 4 and 5 at a front side thereof. When the optical units 4 and 5 are set in such a way, it is possible to deal with a position nearer to the multi-eye image pickup device 2 in comparison with a case in that the optical axes are parallel.

Figure 3:
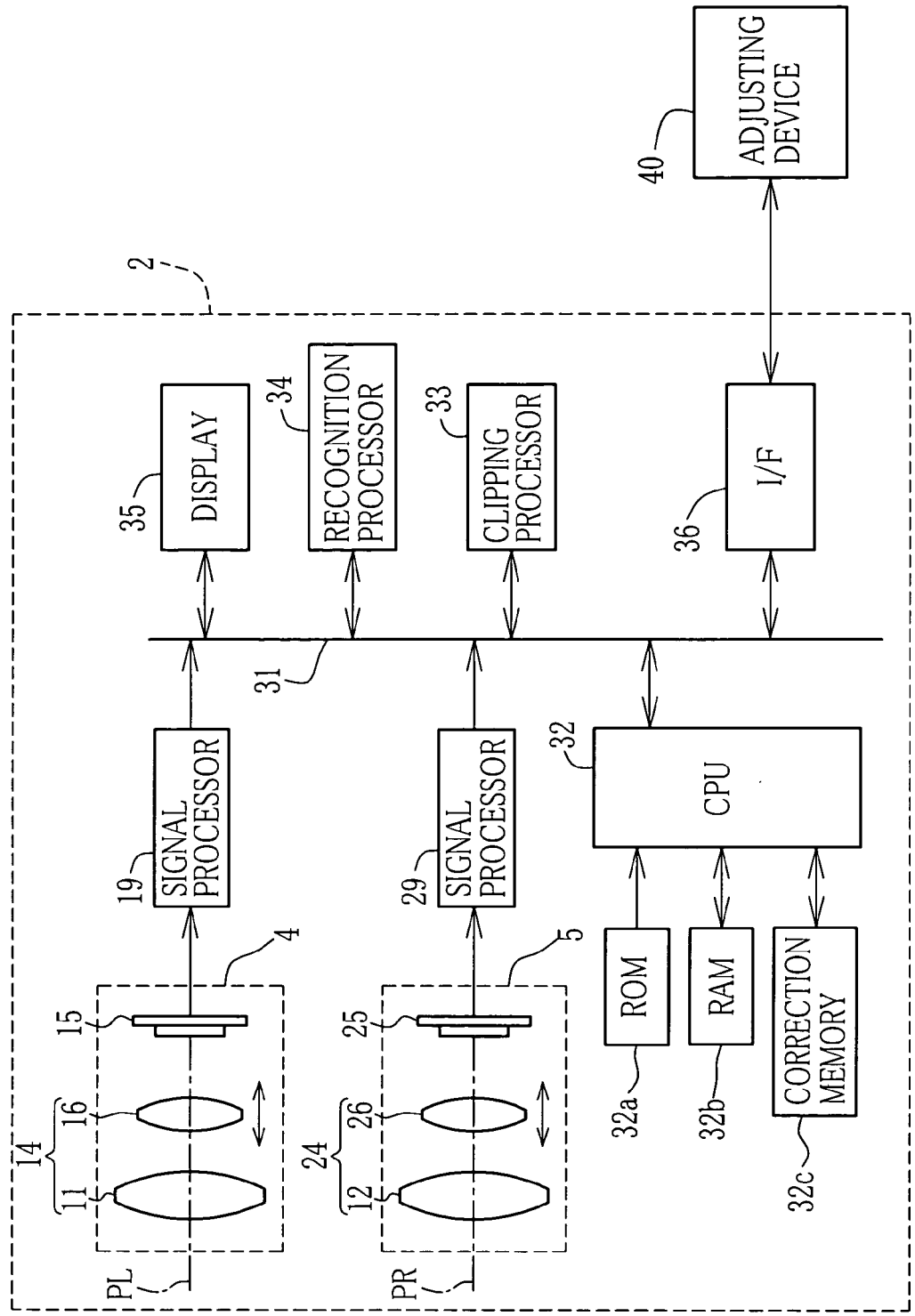
FIG. 3 is a block diagram showing an electrical structure of the multi-eye image pickup device.

As shown in FIG. 3, the left-side optical unit 4 comprises the taking lens 14 and an image sensor 15. The taking lens 14 includes a fixed lens 11 and a focus lens 16, which are held in a lens barrel 17 (see FIG. 2). The focus lens 16 is movable along an optical axis PL. A focusing mechanism not shown moves the focus lens 16 to bring a subject of a desired shooting length into focus.

The image sensor 15 is attached to a retainer plate 18 (see FIG. 2) and is disposed at a rear end of the lens barrel 17. The image sensor 15 photoelectrically converts a subject image formed by the taking lens 14. And then, the image sensor 15 outputs the subject image as an image signal. Incidentally, the taking lens 14 may have any lens structure. As to the image sensor 15, it is possible to use a CCD image sensor, a MOS-type image sensor and so forth.

The image signal outputted from the image sensor 15 is sent to a signal processor 19 including a correlation double sampling (CDS) circuit, an amplifier, an A/D converter and so forth. The signal processor 19 performs a correlation double sampling process for the inputted image signal to remove noises. Further, the signal processor 19 performs an amplifying process for the inputted image signal. The image signal is digitally converted into image data. The signal processor 19 outputs the data of the image, which is taken by the left-side optical unit 4 (hereinafter, this image is referred to as left-side shooting image).

The right-side optical unit 5 comprises a taking lens 24 and an image sensor 25. The taking lens 24 includes the fixed lens 12 and a focus lens 26, which is movable along an optical axis PR. The respective lenses 12 and 26 are held in a lens barrel 27 (see FIG. 2). The image sensor 25 is attached to a retainer plate 28 (see FIG. 2) and is disposed at a rear end of the lens barrel 27. Each component of the right-side optical unit 5 is similar to that of the left-side optical unit 4.

A signal processor 29 processes an image signal similarly to the above-described signal processor 19 to output an image, which is taken by the right-side optical unit 5, as image data (hereinafter, this image is referred to as right-side shooting image).

The signal processors 19 and 29, a CPU 32, a clipping processor 33, a recognition processor 34, a display 35 and an interface circuit 36 are mutually connected via a bus 31. It is possible to mutually transfer the data among these sections and to input instructions from the CPU 32 to the respective sections.

The CPU 32 controls each section of the multi-eye image pickup device 2 and is connected to a ROM 32a, a RAM 32b and a correction memory 32c. The ROM 32a stores programs for executing various sequences. Along the programs, the CPU 32 controls the respective sections. The RAM 32b is utilized as a work memory for contemporarily storing necessary data when a shooting sequence and so forth are executed.

In the correction memory 32c, clip areas defined for clipping taken images are written in advance in order to correct a shift of optical axes. The clip areas are prepared for both of the left side and the right side. The clip areas are predetermined by an adjusting device 40 connected to the multi-eye image pickup device 2. The CPU 32 reads out the clip area from the correction memory 32c, and the read clip area is set in the clipping processor 33. As the correction memory 32c, a flash memory is used, for instance, so that a data holding operation is unnecessary and the data is rewritable. In this way, it is possible to rewrite the data and to reset the clip area.

The clipping processor 33 digitally processes the image data inputted from the respective signal processors 19 and 29 to clip a part of the taken image. In this clipping process, an image of the left-side clip area is clipped from the left-side shooting image, and an image of the right-side clip area is clipped from the right-side shooting image. The clipping processor 33 produces a left-side clip image and a right-side clip image so as to correct the shift of the optical axes of the optical units 4 and 5.

Clip-image data of the respective clip images is inputted into the recognition processor 34 from the clipping processor 33. The recognition processor 34 uses the clip-image data to recognize a face of a taken subject. For instance, the recognition processor 34 judges whether or not the recognized face coincides with one of registered faces. The display 35 shows a judgment result of the recognition processor 34.

The interface circuit 36 is connected to the external adjusting device 40 at a time of setting the respective clip areas to the multi-eye image pickup device 2. The adjusting device 40 obtains a left-side image and a right-side image from the signal processors 19 and 29 via the interface circuit 36. The left-side and right-side images are respectively taken by shooting an adjustment target mark, which is described later, with the optical units 4 and 5. The left-side and right-side images are analyzed to calculate the left-side and right-side clip areas. The adjusting device 40 writes the calculated clip areas in the correction memory 32c via the interface circuit 36 and the CPU 32.

As shown in FIGS. 4A and 4B, the optical axes PL and PR of the optical units 4 and 5 do not extend in predetermined directions before adjusting the optical units 4 and 5 due to attachment accuracy of the optical units themselves and due to attachment accuracy thereof relative to the front cover 3a. Incidentally, FIG. 4A shows the state of the optical axes in a right-and-left (horizontal) direction. FIG. 4B shows the state of the optical axes in an up-and-down (vertical) direction.

Figure 5:
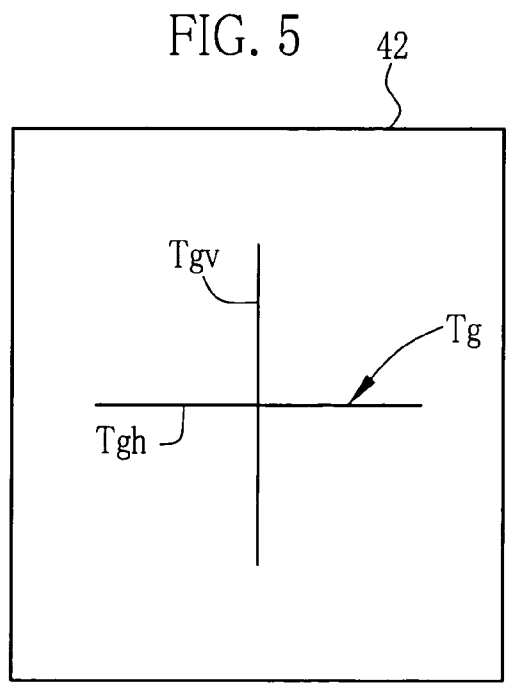
FIG. 5 is an illustration showing an example of the adjustment target mark.

When determining the clip area, the adjustment target mark Tg placed at a reference point is shot by the respective optical units 4 and 5 in a state that the multi-eye image pickup device 2 is connected to the adjusting device 40. For example, the adjustment target mark Tg is a cross mark comprising a horizontal line Tgh and a vertical line Tgv, which are drawn on a plate member 42 such as shown in FIG. 5. The adjustment target mark Tg, however, may have any shape on condition that the reference point is distinguished. For instance, the target mark Tg may have a circular shape.

As shown in FIG. 4, the reference point where the adjustment target mark is placed is located at a position slightly shifted backward relative to a subject position Sp along a central axis Lc, which is perpendicular to a base line Lb passing the centers of the lenses 11 and 12 of the optical units 4 and 5. The subject position Sp is predetermined as a shooting position of the subject. An extra background image is adapted to be reduced, and at the same time, a face image is adapted to fall within the clip area in good balance. It is preferable that a distance between the reference point and the subject position Sp is about a half length of the subject in an anteroposterior direction thereof. In this embodiment, the subject is someone's face and the length thereof is about 20 cm in the anteroposterior direction. In view of this, the distance between the reference point and the subject position Sp is set to about 10 cm.

Figure 6A:
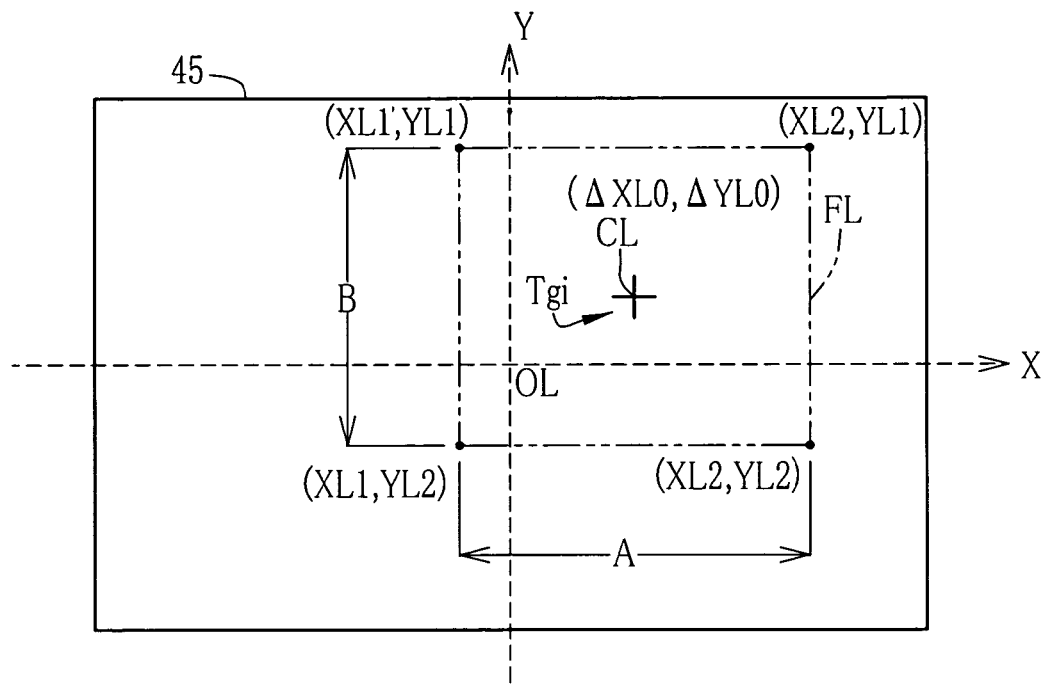
FIGS. 6A and 6B are explanatory illustrations showing a relationship between a shooting frame and a clip area.
Figure 6B:
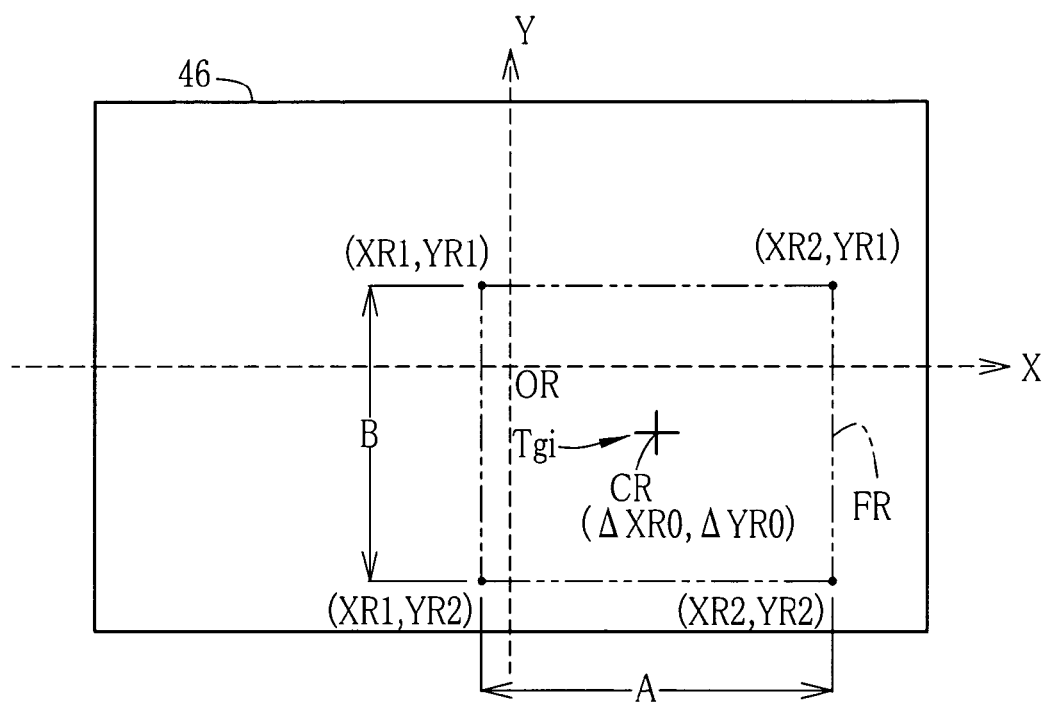

FIGS. 6A and 6B show a relationship between a shooting frame and the clip area in the case that the adjustment target mark Tg is shot. As shown in FIG. 6A, concerning the shooting frame 45 of the left-side optical unit 4, the adjusting device 40 regards an intersection of a cross-shape image Tgi of the adjustment target mark Tg as the center CL of left-side clipping. The center CL corresponds to the reference point and is located within the shooting frame 45 of the left-side optical unit 4. A coordinate ($\Delta$XL0, $\Delta$YL0) of the center CL is calculated from the left-side imaged at a under the condition that a central point OL of the shooting frame 45 is the origin. On the basis of the coordinate ($\Delta$XL0, $\Delta$YL0) and lengths A and B of sides of the rectangular left-side clip area FL, are calculated coordinates (XL1,YL1), (XL2,YL1), (XL2,YL2) and (XL1, YL2) of vertexes of the left-side clip area FL.

In the meantime, concerning the right-side clip area, an intersection of a cross-shape image Tgi of the adjustment target mark Tg is regarded as a center CR of right-side clipping, such as shown in FIG. 6B. On the basis of a coordinate ($\Delta$XR0, $\Delta$YR0) of the center CR and lengths A and B of sides of the rectangular clip area FR, are calculated coordinates (XR1, YR1), (XR2, YR1), (XR2, YR2) and (XR1, YR2) of vertexes of the right-side clip area FR within a shooting frame 46 under the condition that a central point OR of the shooting frame 46 is the origin.

The clip areas FL and FP obtained in this way are the couple of the clip images taken in a state that the optical axes thereof are represented by reference letters PLc and PRc in FIG. 4A. By the way, the center of the shooting frame can be found from a line number of each shooting image and a pixel number of one line.

Such as schematically shown in FIG. 7, the left-side clip area FL, which is calculated by the adjusting device 40 such as described above, is written in the correction memory 32c so as to be defined by the vertex coordinates (XL1,YL1), (XL2, YL1), (XL2, YL2) and (XL1, YL2), which are calculated by the adjusting device 40 such as described above. Further, the right-side clip area FR is written in the correction memory 32c so as to be defined by the vertex coordinates (XR1,YR1), (XR2, YR1;), (XR2, YR2) and (XR1, YR2).

Next, an operation of the above structure is described below. When performing the adjustment, the adjustment target mark Tg is placed at the reference position slightly shifted in a faraway direction relative to the subject position Sp to be shot by the multi-eye image pickup device 2. At this time, the adjusting device 40 is connected to the multi-eye image pickup device 2. The adjustment target mark Tg is taken by the respective optical units 4 and 5.

The shooting images taken by the optical units 4 and 5 are sent to the adjusting device 40 via the interface circuit 36 and are analyzed. And then, the vertex coordinates (XL1, YL1), (XL2, YL1), (XL2, YL2) and (XL1, YL2) of the left-side clip area FL are calculated with respect to the multi-eye image pickup device 2 to be adjusted. Further, the vertex coordinates (XR1,YR1), (XR2,YR1), (XR2,YR2) and (XR1,YR2) of the right-side clip area FR are also calculated. These coordinates are sent from the adjusting device 40 to the correction memory 32c via the interface circuit 36 and the CPU 30, and are written therein.

In this way, the clip areas are set and the adjustment is completed. The adjusted multi-eye image pickup device 2 is installed in a predetermined place and is utilized, for example, to perform person authentication by dealing with faces. When a power supply of the multi-eye image pickup device 2 has been turned on, the clip areas FL and FR are read out of the correction memory 32c to the clipping processor 33, and the vertex coordinates of the clip areas are set.

The multi-eye image pickup device 2 shoots a person to be authenticated after the condition has been adjusted so as to bring the face of the person to the subject position Sp. Upon detecting the subject residing at the subject position Sp by a sensor or the like not shown, the multi-eye image pickup device 2 drives the left-side optical unit 4 and the right-side optical unit 5 respectively to perform shooting.

The left-side shooting image is obtained by the left-side optical unit 4, and the right-side shooting image is obtained by the right-side optical unit 5. These shooting images are respectively converted into the image data by the signal processors 19 and 29. After that, the converted image data is transferred to the clipping processor 33, wherein the image data of the left-side clip area FL is firstly extracted from the image data of the left-side shooting image to clip this shooting image. Successively, the image data of the right-side clip area FR is extracted from the image data of the right-side shooting image to clip this shooting image. In this way, the left-side clip image and the right-side clip image, which are clipped from the respective shooting images, are corrected such that the optical axes of the optical units 4 and 5 intersect at the reference point backwardly shifted relative to the subject position Sp.

The left-side and right-side clip images are clipped such as described above, and the image data thereof are transferred to the recognition processor 34, wherein the inputted image data of the respective clip images are used for recognizing the shot face of the person to be authenticated. Successively, it is judged that the image data of the clip images coincide or not with the preliminarily resisted data. The judgment result is indicated on the display 35.

In the above embodiment, the respective clip areas calculated by the adjusting device 40 are set in the multi-eye image pickup device. However, such as shown in FIG. 8, coordinates of the respective clip centers may be written in the correction memory 32c. On the basis of these coordinates, the respective clip areas may be found by the CPU 30, for instance, of the multi-eye image pickup device 2.

Next, a second embodiment is described below. In this embodiment, rotation is also corrected around the optical axis of the taking lens of the image sensor (shooting frame). Incidentally, this embodiment is identical with the first embodiment except for the following. The substantially same component is denoted by the same reference numeral, and description thereof is abbreviated.

Figure 9A:
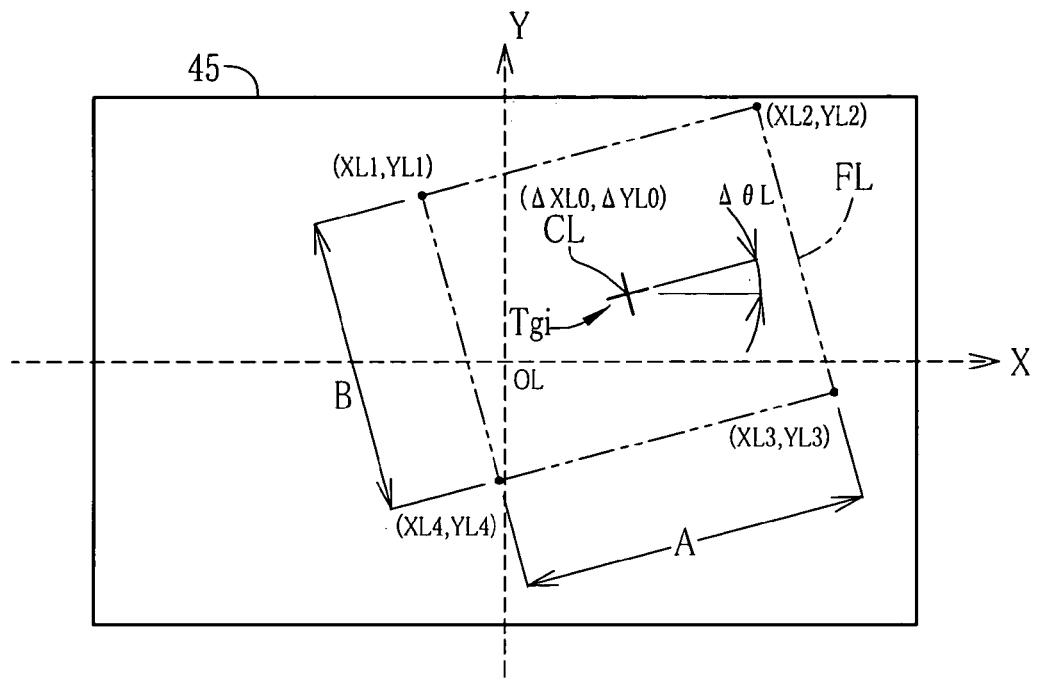
FIGS. 9A and 9B are explanatory illustrations showing a relationship between the shooting frame and the clip area in a case that rotation around the optical axis of the shooting frame is corrected.

As shown in FIG. 9A, the adjusting device 40 analyzes the left-side shooting image, which is obtained after taking the adjustment target mark Tg within the shooting frame 45 by the left-side optical unit 4, to find the coordinate ($\Delta$XL0, $\Delta$YL0) of the center CL of left-side clipping. The center CL is the intersection of the cross-shape image Tgi of the adjustment target mark Tg. The adjusting device 40 also finds an inclination $\Delta\theta$L of the horizontal line Tgh of the adjustment target mark Tg with respect to the left-side shooting image. The inclination $\Delta\theta$L means a rotational shift amount of the shooting frame of the left-side optical unit 4. Further, the adjusting device 40 finds vertex coordinates (XL1, YL2), (XL2, YL2), (XL3, YL3) and (XL4, YL4) of the left-side clip area FL having a rectangular shape of lengths A and B. The left-side clip area FL is rotated around the coordinate ($\Delta$XL0, $\Delta$YL0) of the center CL by the inclination $\Delta\theta$L.

Figure 9B:
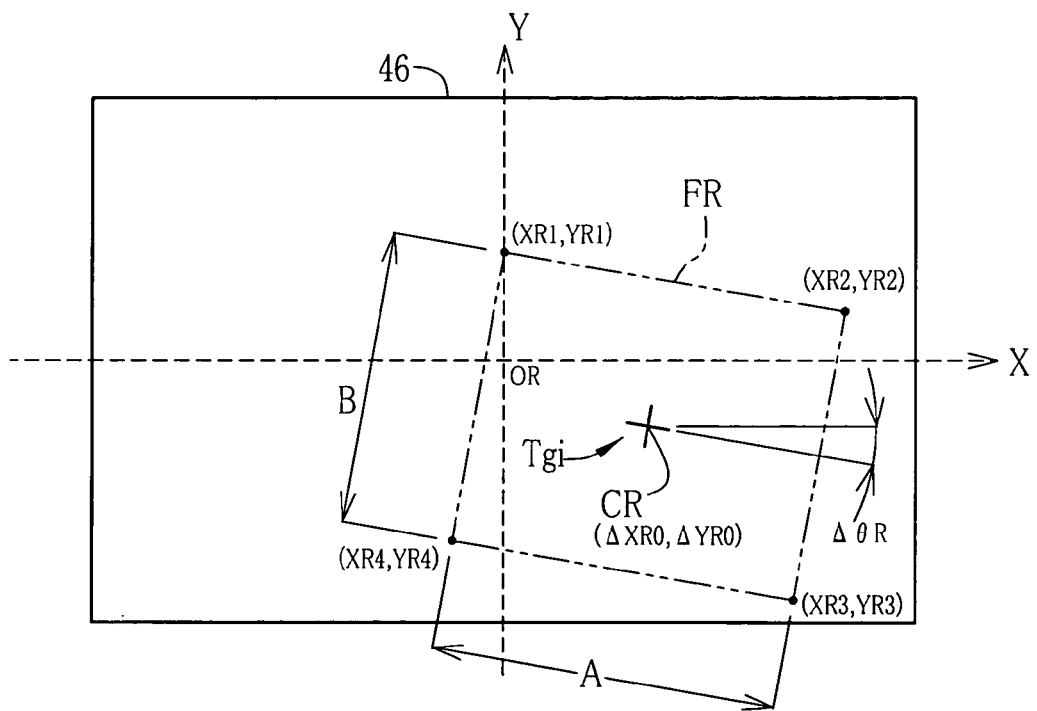

Similarly, as shown in FIG. 9B, the right-side shooting image obtained by taking the adjustment target mark Tg with the right-side optical unit 5 is analyzed to find a coordinate ($\Delta$XR0, $\Delta$YR0) of the center CR of right-side clipping and to find an inclination $\Delta\theta$R of the horizontal line Tgh of the adjustment target mark Tg with respect to the right-side shooting image. The inclination $\Delta\theta$R means a rotational shift amount of the shooting frame of the right-side optical unit 5. Further, vertex coordinates (XR1, YR1), (XR2, YR2), (XR3, YR3) and (XR4, YR4) of the right-side clip area FR are found. The clip area FR has a rectangular shape of lengths A and B, and is rotated around the coordinate ($\Delta$XR0, $\Delta$YR0) of the center CR by the inclination $\Delta\theta$R.

Such as schematically shown in FIG. 10, the vertex coordinates (XL1, YL1), (XL2, YL2), (XL3, YL3) and (XL4, YL4) of the left-side clip area FL and the vertex coordinates (XR1, YR1), (XR2, YR2), (XR3, YR3) and (XR4, YR4) of the right-side clip area FR are written in the correction memory 32c by the adjusting device 40.

The clipping processor 33 clips the image of a region, which is surrounded by the vertexes of the left-side clip area FL written in the correction memory 32c, from the left-side shooting image. This clipped image is outputted as the left-side clip image. Similarly, the clipping processor 33 clips the image of a region, which is surrounded by the vertexes of the right-side clip area FR, from the right-side shooting image. This clipped image is outputted as the right-side clip image. Incidentally, when outputting the respective clip images, a rotating process is performed to prevent the clip image from inclining. In other words, after clipping, the left-side clip image is rotated by an angle of "$-\Delta\theta$L" and the right-side clip image is rotated by an angle of "$-\Delta\theta$R". This kind of the rotating process is easily performed by merely writing the inclinations $\Delta\theta$R and $\Delta\theta$L, which are obtained by the adjusting device 40, in the correction memory 32c.

According to the second embodiment, even if the image sensors 15 and 25 rotate around the optical axes PL and PR of the taking lenses 14 and 24 to shift the shooting frame from the regular position, the rotation thereof is corrected. It is unnecessary to provide a mechanism for rotating the image sensors 15 and 25 around the optical axes PL and PR.

In the case that the rotation of the image sensor around the optical axis is corrected as described above, the inclinations $\Delta\theta$R and $\Delta\theta$L may be written in the correction memory 32c as well as the coordinates of the clipping centers CL and CR, such as shown in FIG. 11. In this case, the clip area is found on the basis of the coordinates of the clip centers CL and CR by the CPU 30, for instance, of the multi-eye image pickup device 2.

Figure 12:
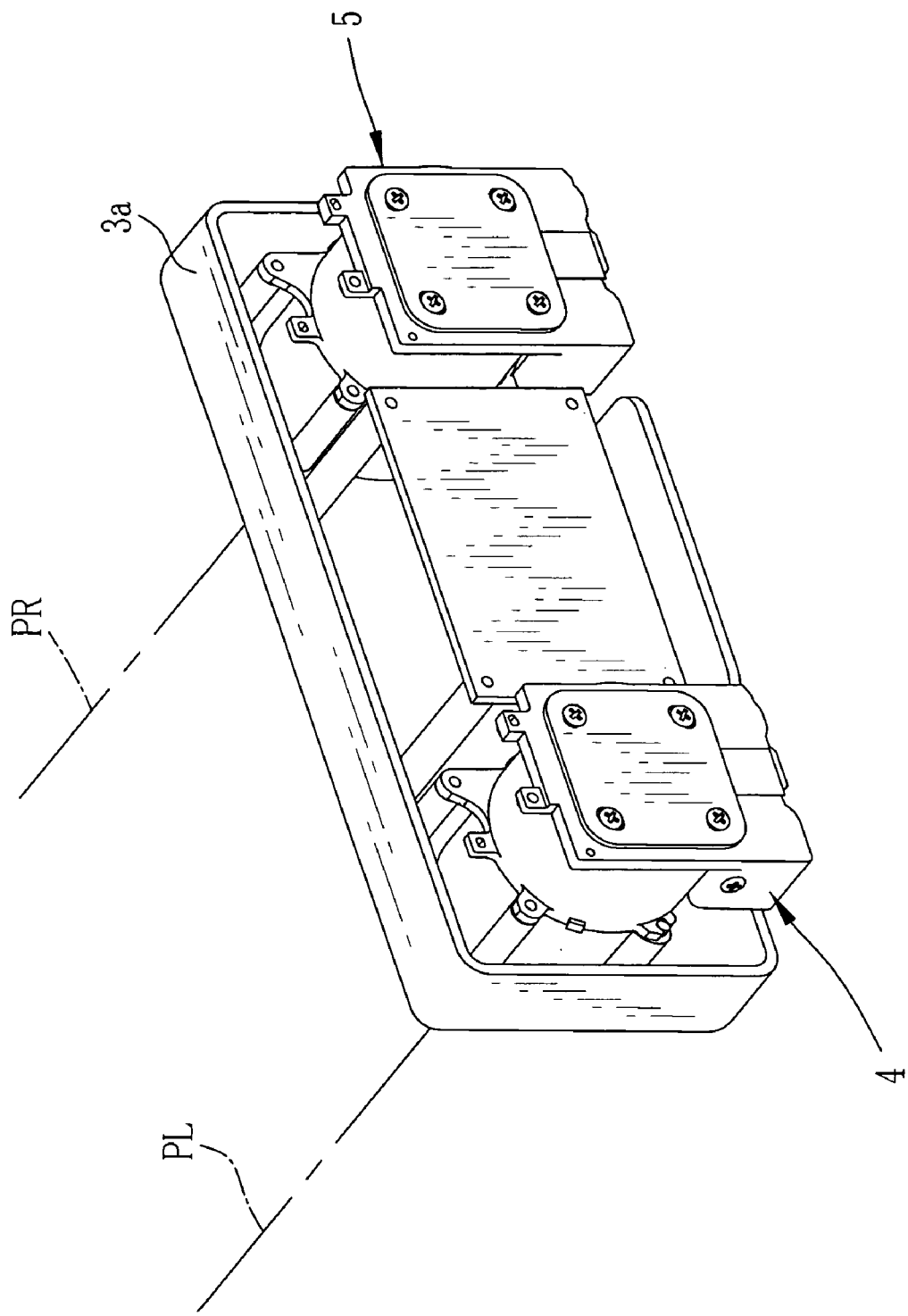
FIG. 12 is a perspective view showing another multi-eye image pickup device in which the optical axes of the optical units are adapted to be parallel.

In a third embodiment shown in FIG. 12, the optical units 4 and 5 are attached to the front cover 3a so as to make the optical axes PL and PR parallel to each-other. Also in this embodiment, it is possible to set and adjust the clip areas similarly to the foregoing embodiments. In addition, there is an advantage that assembling is easily performed since the optical units 4 and 5 are attached in parallel to the front cover 3a being as the chassis.

Figure 13:
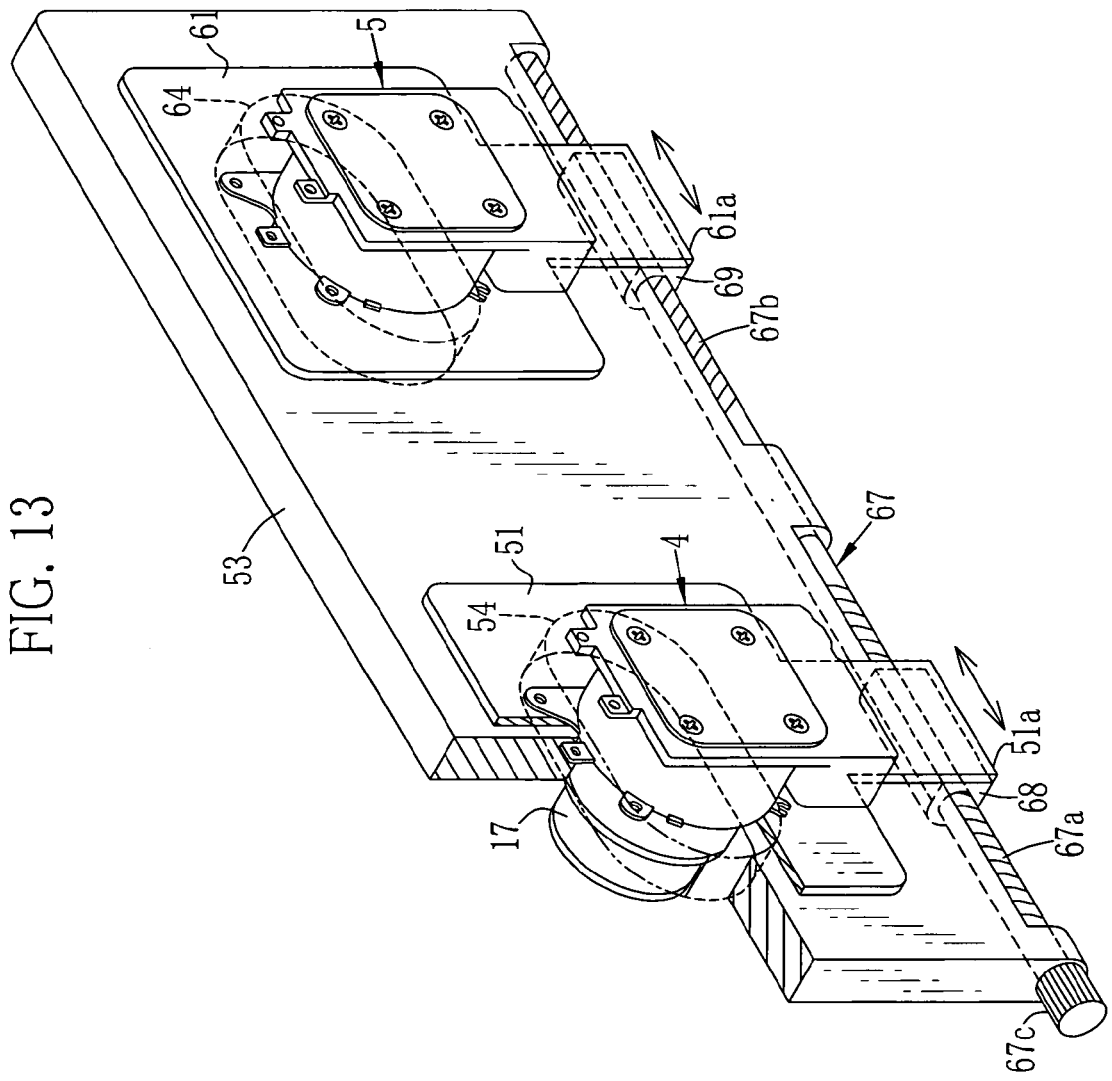
FIG. 13 is a perspective view showing the other multi-eye image pickup device provided with a mechanism for adjusting an interval of the optical units.

In a fourth embodiment shown in FIG. 13, the multi-eye image pickup device is provided with an adjustment mechanism for adjusting an interval of the optical units. The left-side optical unit 4 is fixed to a mounting plate 51, which is attached to a rear side of a chassis 53. As to the lens barrel 17 of the left-side optical unit 4, a front portion thereof is inserted into an opening 54 formed in the chassis 53 to expose the fixed lens in a forward direction. The opening 54 is adapted to be longer than a diameter of the lens barrel 17 in a horizontal direction. In virtue of this, the left-side optical unit 4 is movable in the horizontal direction together with the mounting plate 51. Similarly, the right-side optical unit 5 is fixed to a mounting plate 61 attached to the rear side of the chassis 53, and the lens barrel of the optical unit 5 is inserted into an opening 64. The optical unit 5 is movable in the horizontal direction together with the mounting plate 61.

An adjustment shaft 67 extending in the horizontal direction is rotatably attached to a lower portion of the chassis 53. The adjustment shaft 67 comprises a left-side helicoid part 67a disposed under the left-side optical unit 4, and a right-side helicoid part 67b disposed under the right-side optical unit 5. A male helicoid is formed on a circumference of the left-side helicoid part 67a. On a circumference of the right-side helicoid part 67b, is formed a male helicoid whose direction is reverse to that of the male helicoid of the left-side helicoid part 67a. One end of the adjustment shaft 67 is integrally formed with a knob 67c for rotating the adjustment shaft 67 by the external operation.

Movable members 68 and 69 are attached to the lower portion of the chassis 53 so as to be movable in the horizontal direction. The movable members 68 and 69 are respectively provided with a shaft hole through which the adjustment shaft 67 passes. Inner surfaces of the respective shaft holes of the movable members 68 and 69 are respectively provided with a female helicoid. The movable member 68 is kept in a state that the shaft hole thereof meshes with the left-side helicoid part 67a. The movable member 69 is kept in a state that the shaft hole thereof meshes with the right-side helicoid part 67b. The mounting plate 51 is connected to the movable member 68 via a connection piece 51a disposed at a lower portion of the mounting plate 51. The mounting plate 61 is connected to the movable member 69 via a connection piece 61a disposed at a lower portion of the mounting plate 61.

In virtue of the above structure, the optical units 4 and 5 fixed to the mounting plates 51 and 61 are moved in the horizontal direction together with the movable members 68 and 69 upon operating the knob 67c and rotating the adjustment shaft 67 in any direction. During this movement, the optical units 4 and 5 approach to each other or separate from each other in accordance with the rotational direction of the adjustment shaft 67, since the directions of the male helicoids of the helicoid parts 67a and 67b are reversed. Consequently, it is possible to adjust the interval of the optical units 4 and 5, and it is possible to make the interval of the optical units and an angle thereof optimum in accordance with a distance, a size and so forth of a subject to be taken.

In the fourth embodiment, the optical units 4 and 5 are moved in the reverse directions. However, one of the optical units may be fixed and only the other thereof may be moved.

In the above embodiments, the multi-eye image pickup device performs shooting to recognize someone's face. However, the subject to be recognized is hot limited to someone's face, and it is possible to utilize the multi-eye image pickup devices for various uses. Moreover, in the foregoing embodiments, the adjusting device is connected to the multi-eye image pickup device at the time of adjustment. However, the multi-eye image pickup device may include the function of the adjusting device so as to perform the adjustment by the multi-eye image pickup device itself. Further, by making the adjusting device portable and by including it in the multi-eye image pickup device, it is possible to adjust the multi-eye image pickup device at an actual installation place.

Figure 14:
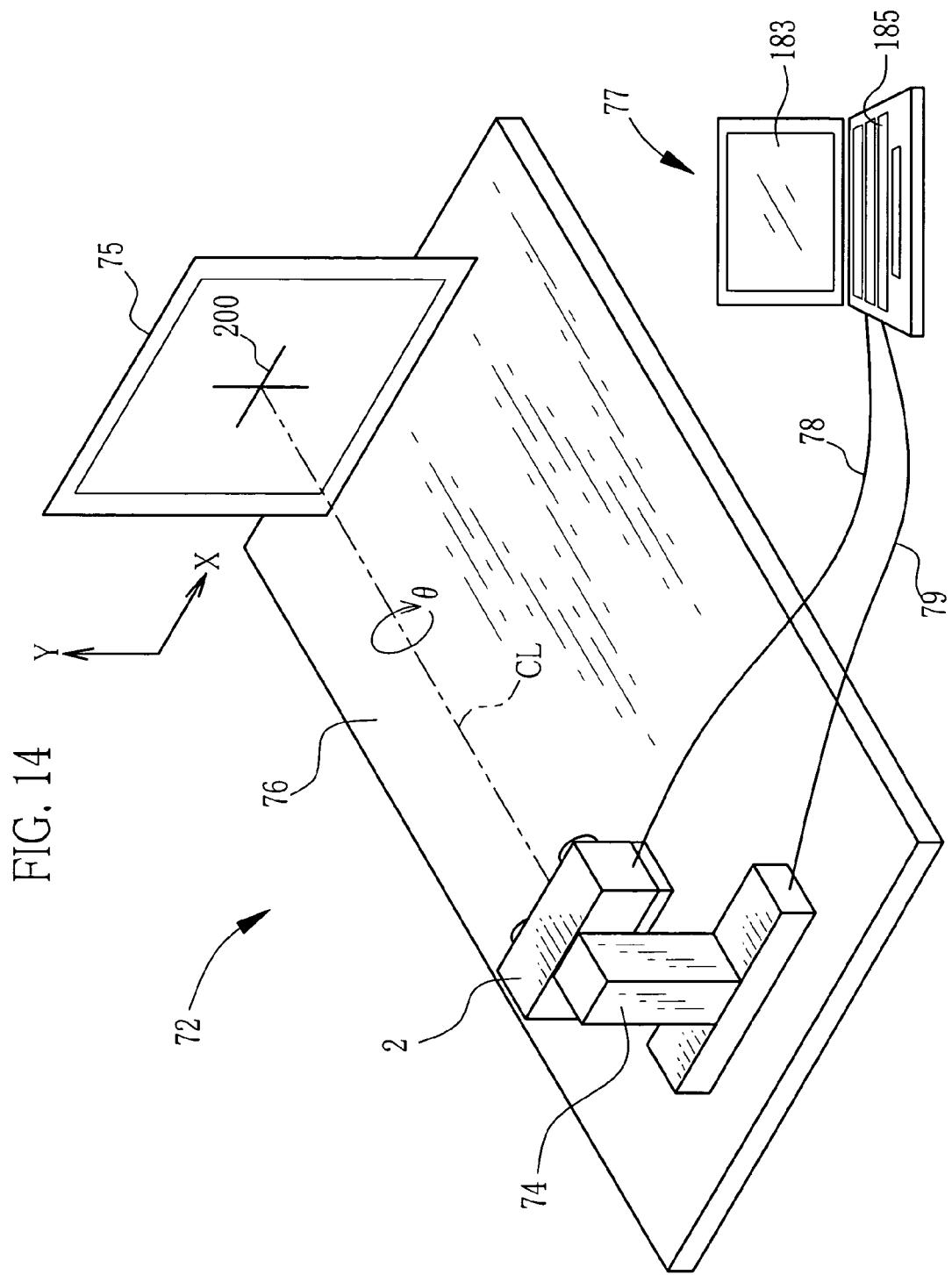
FIG. 14 is an illustration showing a structure of an image-area adjusting system.

Next, a system for adjusting image areas of two optical units included in the multi-eye image pickup device is described below. FIG. 14 shows the image-area adjusting system 72 comprising the multi-eye image pickup device 2 to be adjusted, an adjustment stage 74 for finely adjusting a position of the multi-eye image pickup device 2, a chart 75 to be shot at a time of adjustment, a mounting board 76, and an adjusting device 77. The adjustment stage 74 and the chart 75 are placed on the mounting board 76 so as to face to each other. The adjusting device 77 drives the multi-eye image pickup device 2 and the adjustment stage 74 via communication cables 78 and 79 respectively. A cross mark (adjustment image) 200 is drawn on the chart 75. The cross mark 200 and the multi-eye image pickup device 2 are positioned so as to make the centers thereof coincide with each other. Moreover, a surface of the chart 5 is positioned so as to confront the front of the image pickup device 2. An operator controls the multi-eye image pickup device 2 and the adjustment stage 74 through the adjusting device 77. The image pickup device 2 shoots the cross mark 200 to adjust the image areas of the optical units. The adjustment stage 74 moves the image pickup device 2 attached thereto in X and Y directions. In addition, the adjustment stage 74 rotates the image pickup device 2 around a center line CL in a θ direction to shoot the cross mark 200 in a proper position of the image area.

As to the communication cable 78 connecting the image pickup device 2 and the adjusting device 77, it is possible to utilize USB, IEEE1394 and so forth, for instance. In virtue of the communication cable 78, the image pickup device 2 and the adjusting device 77 are intercommunicated and an electric power (so-called bus power) is supplied from the adjusting device 77 to the image pickup device 2. Meanwhile, the communication cable 79 connecting the adjustment stage 74 and the adjusting device 77 is a general conductive wire to transmit drive signals from the adjusting device 77 to each motor included in the adjustment stage 74.

As mentioned above, FIG. 1 shows the multi-eye image pickup device 2, or the stereoscopic image pickup device comprising the left-side optical unit 4 and the right-side optical unit 5. In this embodiment, the left-side and right-side optical units 4 and 5 are referred to as first and second imaging units respectively. The multi-eye image pickup device 2 further comprises a frame 87 to which the imaging units 4 and 5 are fixed. The front of the frame 87 is provided with screw holes 87a formed for attaching the image pickup device 2 to an exclusive bracket, an exclusive stay, another device and so forth. An opening 88 formed in the case 3 works as an access window for connecting internal mechanisms of the image pickup device 2 to the adjustment stage 74 while the image pickup device 2 is attached to the adjustment stage 74.

Figure 15:
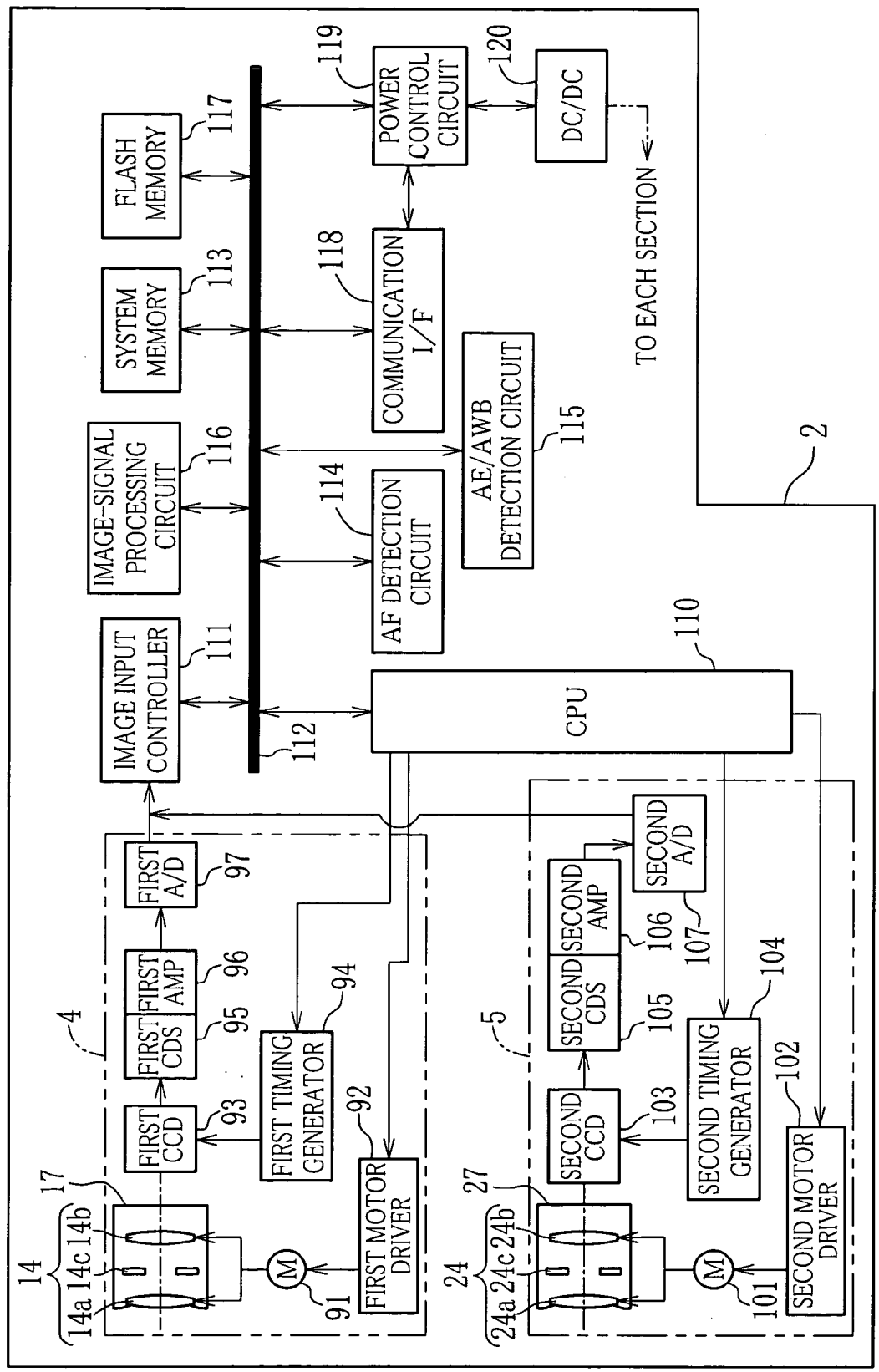
FIG. 15 is a block diagram showing an electrical structure of the multi-eye image pickup device.

FIG. 15 is a block diagram showing an electrical structure of the image pickup device 2 used in the image-area adjusting system 72. The first imaging unit 4 comprises a first lens barrel 17, a first focus motor 91, a first motor driver 92, a first CCD (imaging device) 93, a first timing generator 94, a first CDS 95, a first AMP 96 and a first A/D converter 97.

In this embodiment, the first lens barrel 17 contains a taking lens 14 comprising a zoom lens 14a, a focus lens 14b and a stop 14c. The zoom lens 14a and the focus lens 14b of the first lens barrel 17 are moved in an optical-axis direction thereof by means of the first focus motor 91 connected to a CPU 110 controlling the whole of the image pickup device 2. The CPU 110 controls the first motor driver 92 to drive the first focus motor 91.

The first CCD 93 is disposed behind the taking lens 14, which forms a subject image on a light-receiving surface of the first CCD 93 connected to the CPU 110 via the first timing generator 94. The CPU 110 controls the first timing generator 94 to generate a timing signal (clock pulse). The first CCD 93 is driven by the inputted timing signal.

The first CCD 93 photoelectrically converts the subject image into an electronic signal, and this image signal is sent to the first CDS 95 being as a correlation double sampling circuit. The first CDS 95 receives the image signal from the first CCD 93 and outputs image data of R, G and B accurately corresponding to a stored charge amount of each cell of the first CCD 93. The image data outputted from the first CDS 95 is amplified by the first AMP 96 and is converted into digital data by the first A/D converter 97. The digitized image data is outputted as first image data from the first A/D converter 97 to an image input controller 111.

A structure of the second imaging unit 5 is similar to that of the first imaging unit 4. The second imaging unit 5 comprises a second lens barrel 27, a second focus motor 101, a second motor driver 102, a second CCD (imaging device) 103, a second timing generator 104, a second CDS 105, a second AMP 106 and a second A/D converter 107. Similarly to the first lens barrel 17, the second lens barrel 27 contains a taking lens 24 comprising a zoom lens 24a, a focus lens 24b and a stop 24c. The second A/D converter 107 outputs second image data to the image input controller 111 similarly to the first A/D converter 97.

The image input controller 111 is connected to the CPU 110 via a data bus 112 to control the CODs 93 and 103, the CDSs 95 and 105, the AMPs 96 and 106, and the A/D converters 97 and 107 in accordance with control instructions outputted from the CPU 110. The CPU 110 controls the image input controller 111 to temporarily store the image data in a predetermined area of a system memory 113.

The system memory 113 comprises a ROM and a RAM to store setting information and various programs for controlling the multi-eye image pick up device 2, and at the same time, to work as a buffer for temporarily storing the program, which is read out by the CPU 110, the obtained image data and so forth.

The CPU 110 is connected to an AF detection circuit 114 and an AE/AWB detection circuit 115 via the data bus 112. The CPU 110 controls the AF detection circuit 114 to find AF detection values on the basis of the image data obtained by the imaging units 4 and 5, so as to make focus adjustment of the focus lenses 14b and 24b of the taking lenses 14 and 24 optimum for shooting. In accordance with the found AF detection values, the first and second motor drivers 92 and 102 are controlled to move the respective focus lenses 14b and 24b to an optimum position. Further, the CPU 110 controls the AE/AWB detection circuit 115 to find AE/AWB detection values on the basis of the image data obtained by the imaging units 4 and 5, so as to make exposure adjustment and white-balance collection optimum for shooting. In accordance with the found AE/AWB detection values, the respective stops 14c, 24c and the respective CCDs 93, 103 are controlled to make the exposure amount and the white-balance correction optimum.

Figure 16:
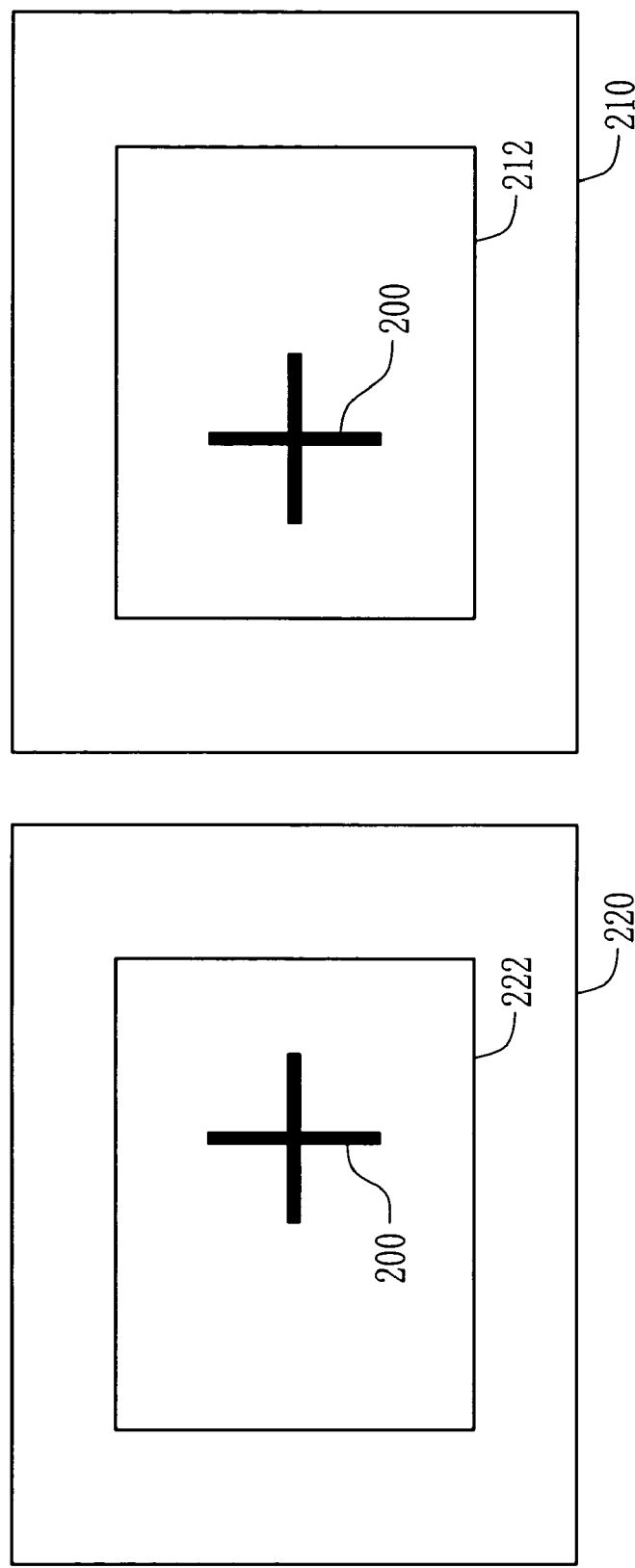
FIG. 16 is an explanatory illustration showing an effective pixel area of image data and a clip area.

The CPU 110 is also connected to an image-signal processing circuit (image clipper) 116 and a flash memory (nonvolatile memory) 117 via the data bus 112. The image-signal processing circuit 116 reads out the image data from the system memory 113 and performs varied image processing of tone conversion, white-balance processing, gamma correction processing and so forth. The processed image data is stored in the system memory 113 again. As shown in FIG. 16, the image-signal processing circuit 116 performs clip processing for clipping only portions, which correspond to predetermined clip areas 212 and 222, from the image data 210 and 220 being as the effective pixel areas of the CCDs 93 and 103. Incidentally, the effective pixel area means a shooting frame of the image sensor. After installing the multi-eye image pickup device 2 in an apparatus, a room and so forth, only the portions clipped by the clip processing are transferred to an external equipment as image areas of the multi-eye image pickup device 2. Hereinafter, the portions corresponding to the clip areas 212 and 222 are referred to as the image areas of the respective imaging units 4 and 5.

The flash memory 117 stores clip-position data representing positions of the clip areas 212 and 222 located on the image data 210 and 220. On the basis of the clip-position data, the image-signal processing circuit 116 determines the clip areas 212 and 222 to perform the clip processing. By the way, in an initial state, the clip areas 212 and 222 are determined, for example, such that the centers of the image data 210 and 220 coincide with the centers of the clip areas 212 and 222 as shown in FIG. 16.

The CPU 110 is also connected to a communication I/F (communication tool) 118 via the data bus 112. The communication I/F 118 is connected to the communication cable 78 and is provided with a connector, a circuit and so forth conforming to specification of the communication cable 78. The CPU 110 performs communication with external equipments including the adjusting device 77, via the communication I/F 118 and the communication cable 78. The communication I/F 118 is also connected to a power control circuit 119 comprising, for example, a filter for removing power supply noise and a limiter for preventing overcurrent. The power control circuit 119 supplies the bus power, which is supplied through the communication cable 78, to the respective sections of the multi-eye image pickup device 2 via a DC/DC converter 120. After performing the varied image processing, the image data 210 and 220 are stored in the system memory 113 again and are outputted to the communication I/F 118. The outputted image data is transferred to the external equipment through the communication cable 78.

Figure 17:
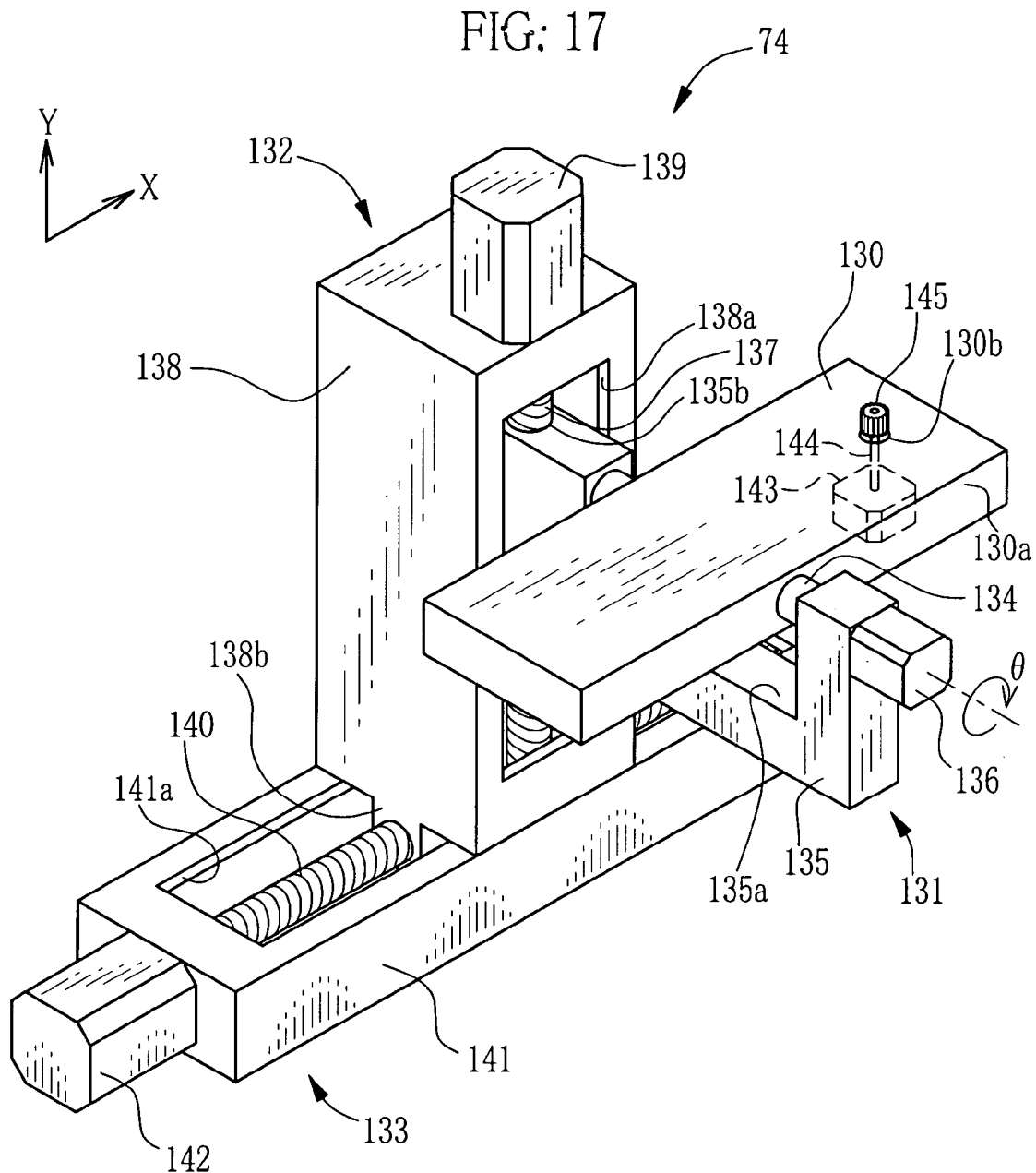
FIG. 17 is a perspective view showing an adjustment stage.

FIG. 17 is a perspective view showing a structure of the adjustment stage 74 comprising an attachment plate (stationary portion) 130 to which the multi-eye image pickup device 2 is attached, a rotation-angle adjuster 131 for rotating the attachment plate 130 in the θ direction, a Y-direction adjuster 132 for moving the rotation-angle adjuster 131 in the Y direction together with the attachment plate 130, and an X-direction adjuster 133 for moving the respective components in the X direction. The attachment plate 130 is provided with a shaft 134 passing through the center of a lateral surface 130a extending in a longitudinal direction.

The rotation-angle adjuster 131 comprises a retainer 135 and a θ-angle adjustment motor 136. The retainer 135 rotatably holds the shaft 134 of the attachment plate 130 via a bearing or the like. The θ-angle adjustment motor 136 rotates the attachment plate 130 around the shaft 134. The rotation-angle adjuster 131 drives the θ-angle adjustment motor 136 on the basis of a drive signal, which is outputted from the adjusting device 77, to adjust an angle of θ within a range where the attachment plate 130 disengages from a cutout 135a of the retainer 135.

The Y-direction adjuster 132 comprises a ball screw 137, a case 138 for rotatably holding the ball screw 137, and a Y-direction adjustment motor 139 for rotating the ball screw 137. A nut 135b of a female screw is formed in one end of the retainer 135 to mesh with the ball screw 137 behind an opening 138a formed in the front of the case 138. The Y-direction adjuster 132 drives the Y-direction adjacent motor 139 on the basis of the drive signal outputted from the adjusting device 77. The ball screw 137 rotates in association with the rotation of the Y-direction adjustment motor 139 and moves the attachment plate 130 and the rotation-angle adjuster 131 in the Y direction in accordance with its rotational direction to perform Y-direction adjustment within a range where the retainer 135 disengages from the case 138. Incidentally, for example, the retainer 135 and the case 138 are connected via a straight key, which is not shown, to prevent the rotation-angle adjuster 131 from rotating in association with the rotation of the ball screw 137.

The X-direction adjuster 133 has a similar structure with the Y-direction adjuster 132 and comprises a ball screw 140, a case 141 for rotatably holding the ball screw 140, and an X-direction adjustment motor 142 for rotating the ball screw 140. A nut 138b of a female screw is formed in one end of the case 138 of the Y-direction adjuster 132 to mesh with the ball screw 140 behind an opening 141a formed in the front of the case 141. The X-direction adjuster 133 drives the X-direction adjustment motor 142 on the basis of the drive signal outputted from the adjusting device 77. The ball screw 140 rotates in association with the rotation of the X-direction adjustment motor 142 and moves the Y-direction adjuster 132 and the components connected thereto in the X direction to perform X-direction adjustment within a range where the case 138 disengages from the case 141.

A CCD adjustment motor 143 is attached to the rear of the attachment plate 130 to adjust a rotation angle in a γ direction (see FIG. 18) around an optical axis P of the second CCD 103. Moreover, a through hole 130b is formed in the attachment plate 130. A rotary shaft 144 of the CCD adjustment motor 143 passes the through hole 130b and protrudes from the surface of the attachment plate 130. The top of the rotary shaft 144 is provided with a gear 145, which is inserted into the opening 88 of the case 3 when the multi-eye image pickup device 2 is mounted on the attachment plate 130.

Figure 18:
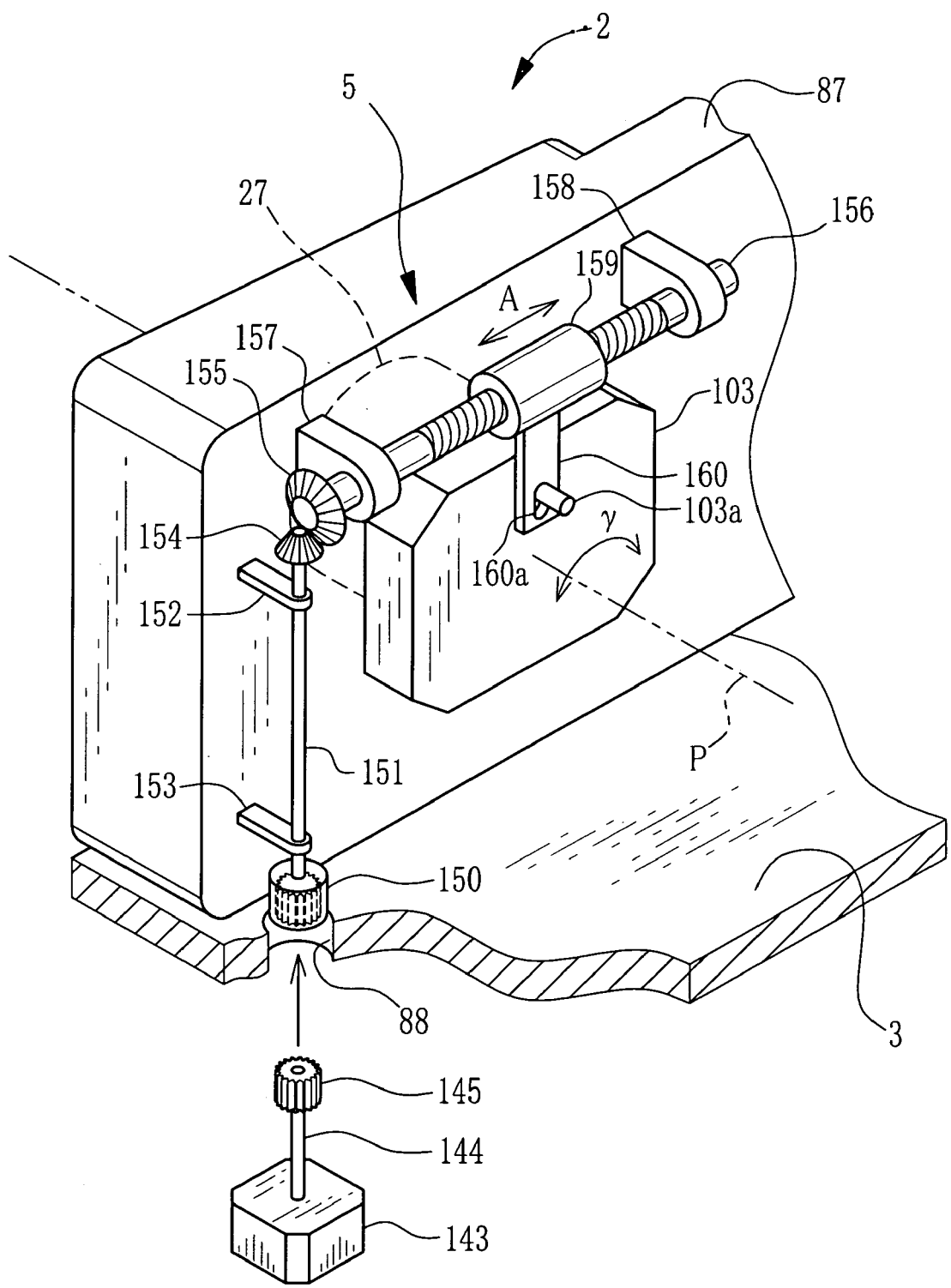
FIG. 18 is a perspective view showing a structure of a rotational-angle adjusting mechanism.

As shown in FIG. 18, an inner position of the multi-eye image pickup device 2 confronting the opening 88 is provided with a cylindrical connection member 150 having a closed end. Grooves corresponding to the respective teeth of the gear 145 are formed in an inner surface of the connection member 150. A shaft 151 is connected to the closed end of the connection member 150 so as to extend from the center thereof. When the multi-eye image pickup device 2 is mounted on the attachment plate 130, the connection member 150 is coupled with the gear 145 inserted through the opening 88 to transmit a rotational force of the CCD adjustment motor 143 to the shaft 151, which is fixed to the frame 87 via two supports 152 and 153 rotatably holding the shaft 151 with a bearing or the like. Meanwhile, the end of the shaft 151 opposite to the connection member 150 is provided with a bevel gear 154, which meshes with another bevel gear 155 displaced in the γ direction by 90 degrees. The bevel gear 155 is joined to a ball screw 156 having a screw formed on a central portion thereof. The ball screw 156 is fixed to the frame 87 via two supports 157 and 158 rotatably holding the ball screw 156 with a bearing or the like. The screw portion of the ball screw 156 is provided with a movable cylinder 159 in which a female screw is formed. The movable cylinder 159 has a vertically formed link member 160 provided with an elongate hole 160*a* to engage with a pin 103*a* formed on the second CCD 103.

The rotational force of the CCD adjustment motor 143 is transmitted to the shaft 151 through the connection member 150 to rotate the ball screw 156 via the respective bevel gears 154 and 155. The ball screw 156 moves the movable cylinder 159 in either of directions shown by arrows A in accordance with a rotational direction of the ball screw 156. The movable cylinder 159 moving in either direction presses the pin 103*a* with the link member 160. The second imaging unit 5 is rotatably retained by the frame 87. Thus, when the pin 103*a* pressed by the link member 160 moves along the elongate hole 160*a*, the second imaging unit 5 rotates in the γ direction. In this way, the rotation angle of the second CCD 103 is adjusted in the γ direction. To sum up, the rotation-angle adjusting mechanism is composed of the connection member 150, the shaft 151, the bevel gears 154 and 1 155, the ball screw 156 and the movable cylinder 159.

Figure 19:
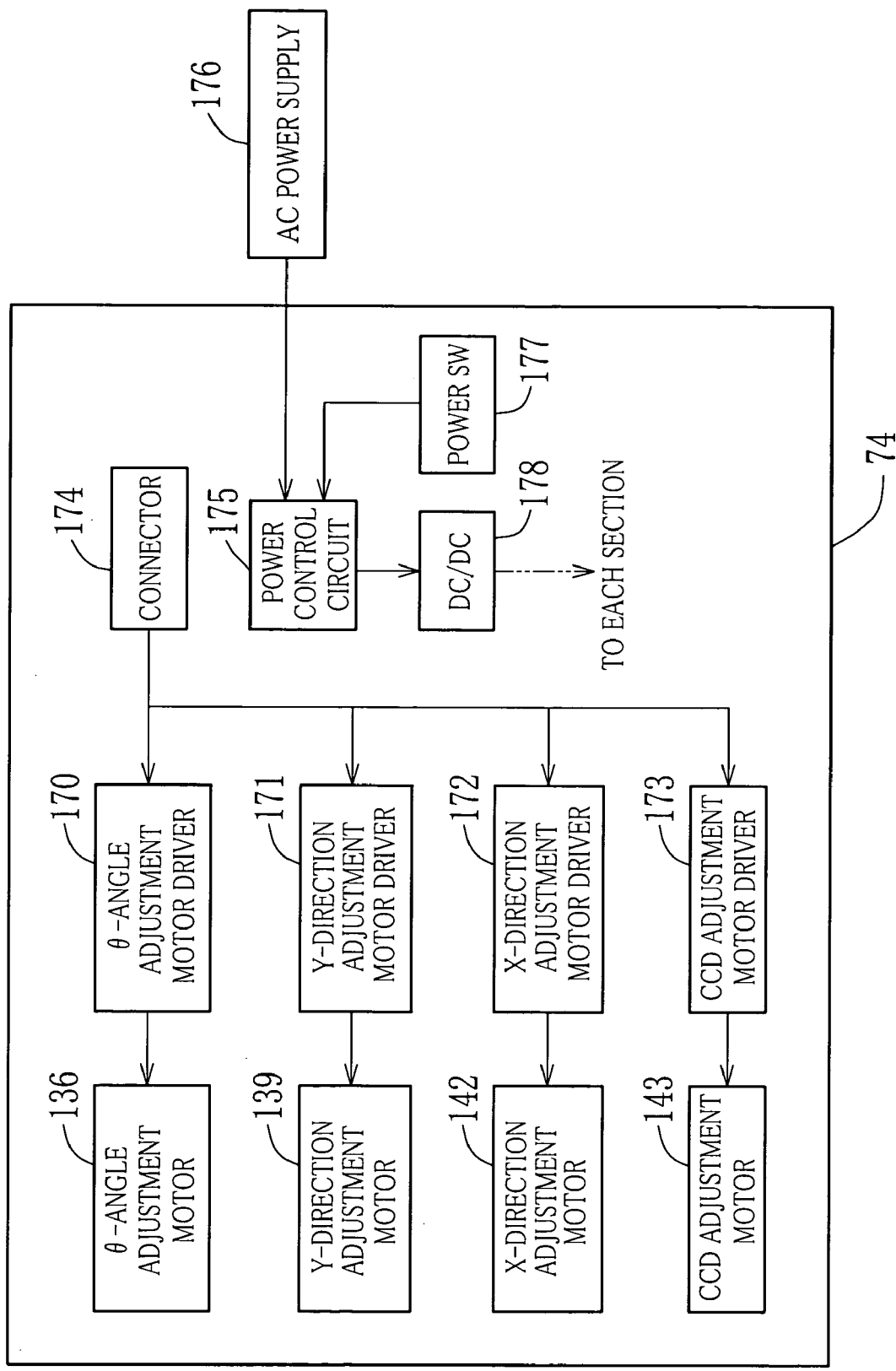
FIG. 19 is a block diagram showing an electrical structure of the adjustment stage.

FIG. 19 is a block diagram showing an electrical structure of the adjustment stage 74. The motors 136, 139, 142 and 143 are connected to exclusive motor drivers 170, 171, 172, and 173 for driving the respective motors. The motor drivers 170 to 173 are connected to the adjusting device 77 via a connector 174 and the communication cable 79 joined to the connector 174. The motor drives 170 to 173 drive the respective motors 136, 139, 142 and 143 in accordance with drive signals outputted from the adjusting device 77. Incidentally, as to the respective motors 136, 139, 142 and 143, a stepping motor is used for instance to strictly control a rotation amount of the rotation-angle adjuster 131 and movement amounts of the Y-direction and X-direction adjusters 132 and 133 on the basis of step angles rotating in accordance with input of the pulse signal (drive signal).

The adjustment stage 74 is provided with a power control circuit 175 to which an AC power supply 176 and a power switch 177 are connected. For example, the power control circuit 175 comprises an AC/DC converter, a filter, a limiter and so forth. The AC/DC converter converts the AC power, which is supplied from the AC power supply 176, into the DC power. The filter removes power supply noise. The limiter prevents overcurrent. The power control circuit 175 sends the converted DC power to a DC/DC converter 178 in accordance with ON/OFF of the power switch 177 exposed to the outside of the adjustment stage 74. The DC/DC converter 178 converts the power, which is sent from the power control circuit 175, into a predetermined voltage and supplies the converted power to each section of the adjustment stage 74.

Figure 20:
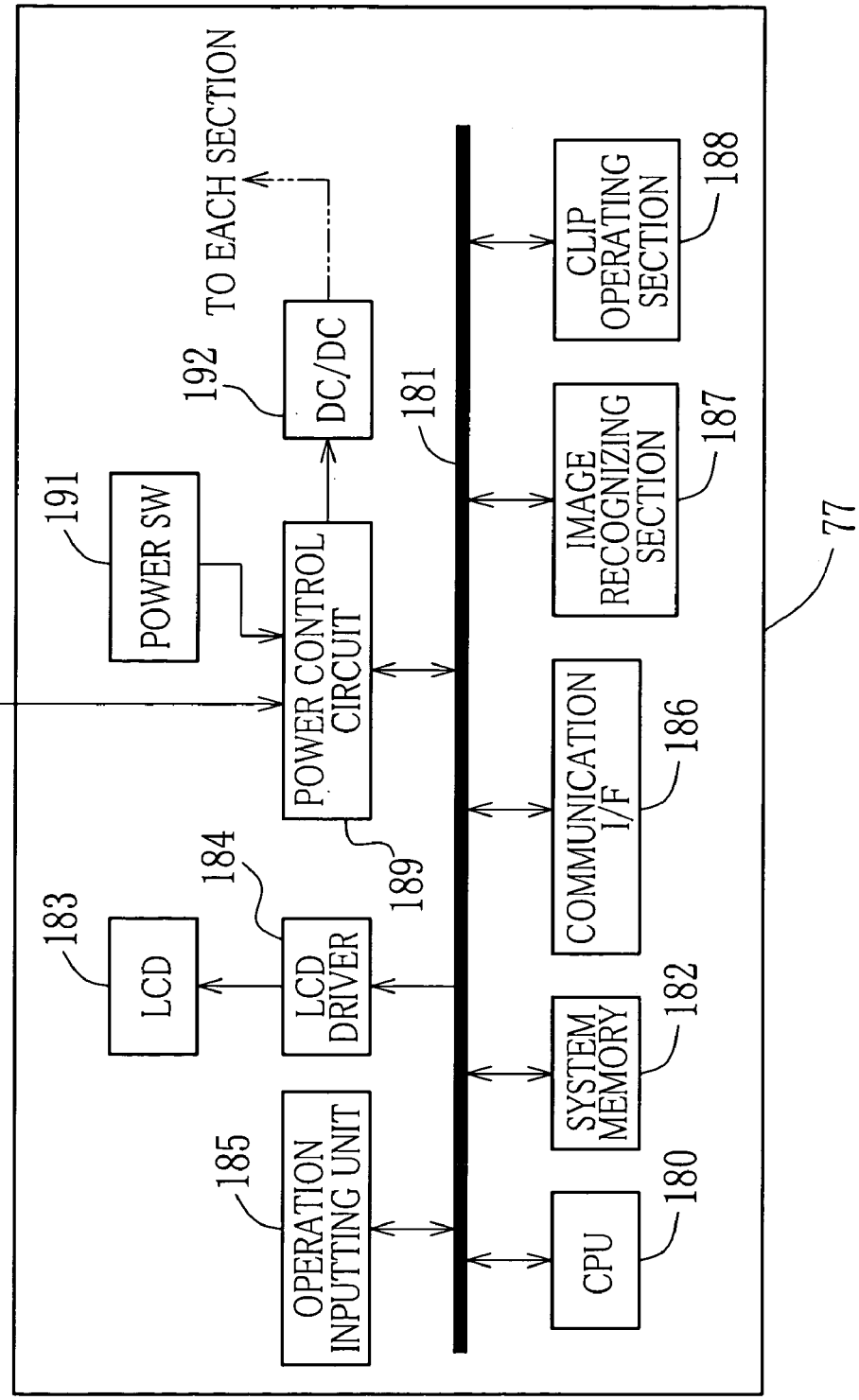
FIG. 20 is a block diagram showing an electrical structure of an adjusting device.

FIG. 20 is a block diagram showing an electrical structure of the adjusting device 77, the respective sections of which are integrally controlled by a CPU 180. A system memory 182 connected to the CPU 180 via a data bus 181 comprises a ROM, a RAM and so forth to store setting information and various programs for controlling the adjusting device 77. In addition, the system memory 182 works as a buffer for temporarily storing the program read out by the CPU 180.

The adjustment device 77 is provided with an LCD panel 183 and an operation inputting unit 185 (see FIG. 14). The LCD panel 183 displays various images in accordance with the programs stored in the system memory 182. The LCD panel 183 is connected to the CPU 180 via an LCD driver 184 and the data bus 181 to display the various images under the control of the CPU 180. The operation inputting unit 185 is a well-known input device including a keyboard, a mouth and so forth to transmit various operations, which are inputted by an operator, to the CPU 180 via the data bus 181. Incidentally, a touch screen panel may be provided on the LCD panel 183 and may be used as the operation inputting unit 185.

The CPU 180 is also connected to a communication I/F (communication tool) 186, an image recognizing section 187, a clip operating section 188, and a power control circuit 189 via the data bus 181. The communication I/F 186 is connected to the communication cables 78 and 79 for connecting to the multi-eye image pickup device 2 and the adjustment stage 74. In the communication I/F 186, a connector and a circuit are formed in conformity with the specification of the communication cables 78 and 79. Via the communication I/F 186 and the communication cables 78 and 79, the CPU 180 performs communication with the multi-eye image pickup device 2 and the adjustment stage 74 to control them.

The image recognizing section 187 recognizes the cross mark 200 from the image data 210 and 220 of the imaging units 4 and 5, which are inputted via the communication I/F 186, by using a well-known pattern matching method to obtain reference-position data of a center position of the cross mark 200 from the image data 210 and 220. On the basis of the reference-position data obtained by the image recognizing section 187, the clip operating section 188 updates clip-position data of the clip areas 212 and 222 stored in the flash memory 117 of the multi-eye image pickup device 2. The updated clip-position data is written in the flash memory 117 again. In this way, the adjustment device 77 adjusts the image areas of the imaging units 4 and 5 by adjusting the positions of the clip areas 212 and 222.

The power control circuit 189 is connected to an AC power supply 190 and a power switch 191. For example, the power control circuit 189 comprises an AC/DC converter, a filter and a limiter. The AC/DC converter converts an AC power, which is supplied from the AC power supply 190, into a DC power. The filter removes power supply noise. The limiter prevents overcurrent. The power control circuit 189 sends the converted DC power to a DC/DC converter 192 in accordance with ON/OFF of the power switch 191 exposed to the outside of the adjusting device 77. The DC/DC converter converts the electric power, which is outputted from the power control circuit 189, into a predetermined voltage. The converted electric power is supplied to each section of the adjusting device 77. Moreover, the electric power from the DC/DC converter 192 is also supplied to the communication I/F 186 and is sent to the multi-eye image pickup device 2 as the bus power. Incidentally, turning on and off the power supply of the multi-eye image pickup device 2 is controlled by supplying or not the bus power from external equipments including the adjusting device 77.

Figure 21:
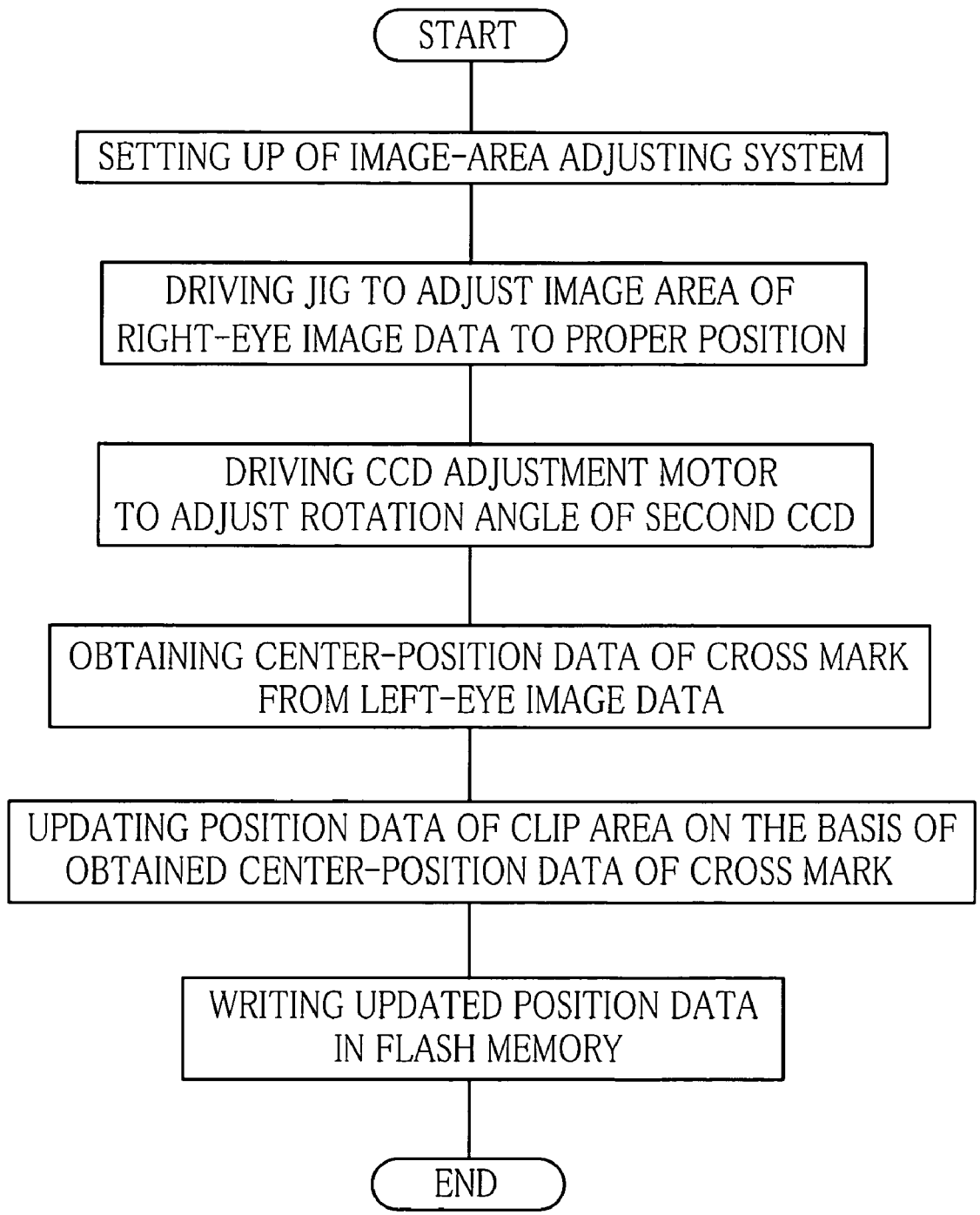
FIG. 21 is a flowchart showing a method for adjusting an image area.

Next, an operation of this embodiment is described below, referring to a flowchart shown in FIG. 21 and explanatory illustrations shown in FIGS. 22A to 22C. When adjusting the image areas of the imaging units 4 and 5 of the multi-eye image pickup device 2, it is firstly done that the respective components are disposed such as shown in FIG. 14 to create the image-area adjusting system 72. After disposing the respective components, the power switch 177 of the adjustment stage 74 and the power switch 191 of the adjusting device 77 are turned on to start the respective components. At this time, the multi-eye image pickup device 2 is started by the bus power supplied from the adjusting device 77 through the communication cable 78.

Figure 22A:
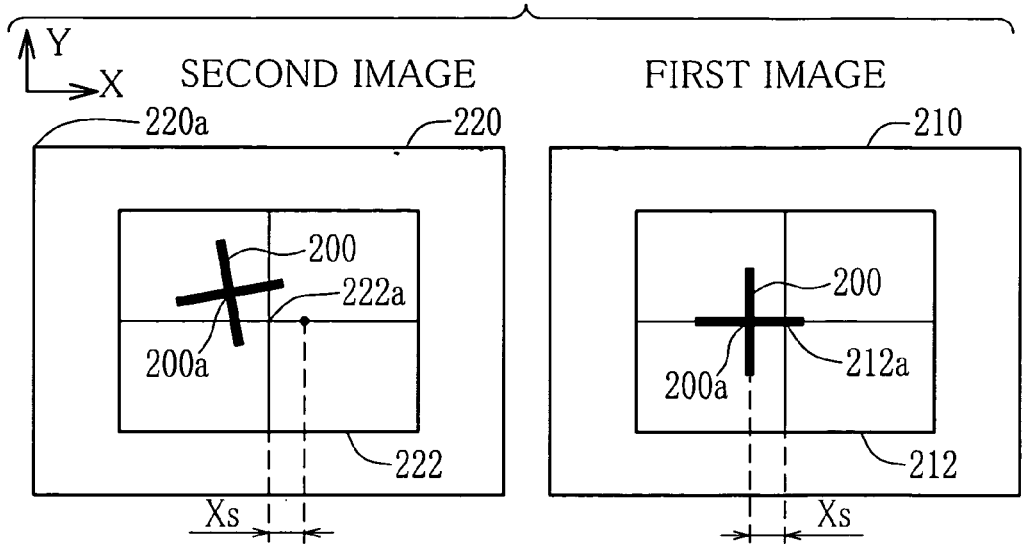
FIGS. 22A, 22B and 22C are illustrations explaining the method for adjusting the image area.
Figure 22B:
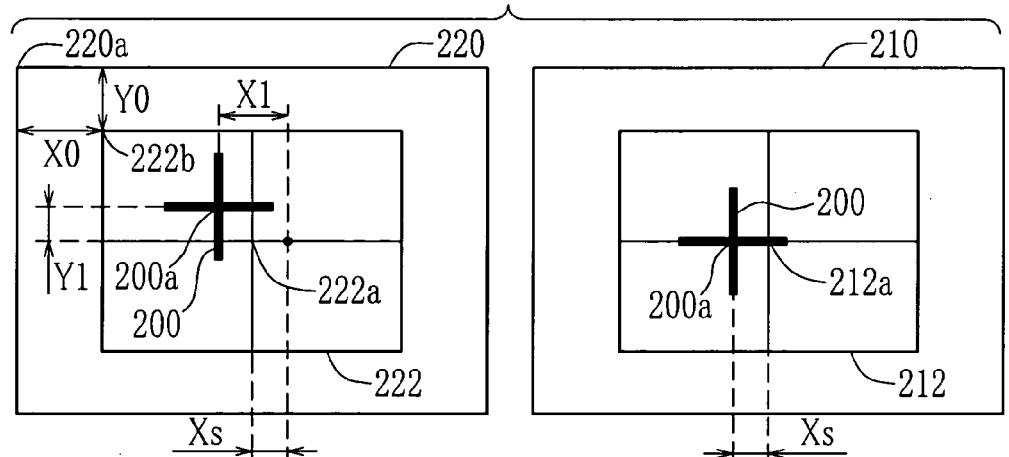
Figure 22C:
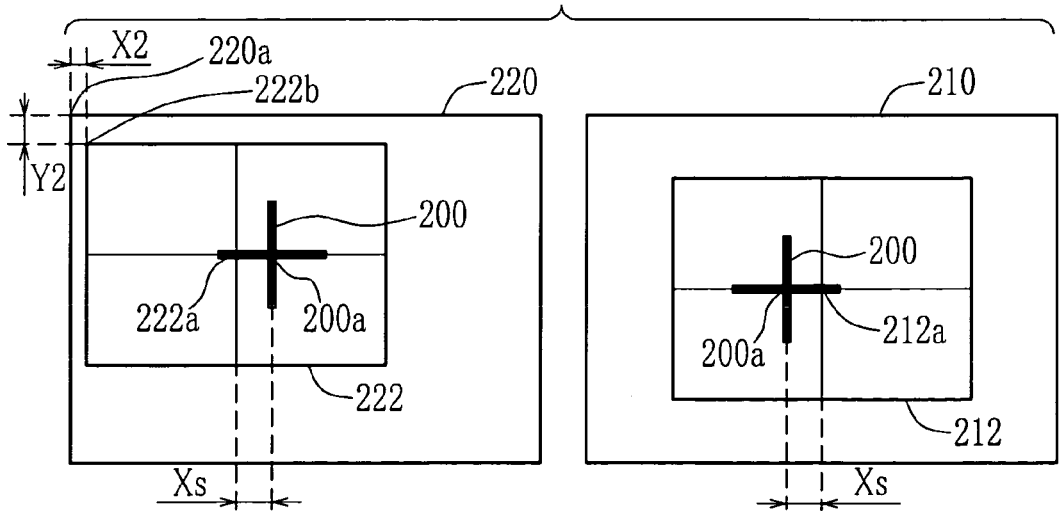

After starting the respective components, the adjustment stage 74 is controlled from the adjusting device 77 to move the center 200a of the cross mark 200, which is caught in the first image data 210, to a position of (−Xs, 0) such as shown in FIGS. 22A to 22C. At this time, the reference position is located at the center 212a of the clip area 212. Moreover, Xs corresponds to parallax of the imaging units 4 and 5, and is definitely decided in accordance with base-line lengths of the imaging units 4 and 5, a distance to the chart 75, a convergence angle of the imaging units 4 and 5, and so forth. In other words, when the center 200a of the cross mark 200 is kept in the position of (−Xs, 0), the first image becomes the proper image area having no positional deviation except for the parallax. The position of (−Xs, 0) is referred to as an adequate position, and the center 200a of the cross mark 200 is referred to as a reference position. Incidentally, the position control may be manually performed by an operator with the operation inputting unit 185. Alternatively, the respective portions of the adjustment stage 74 may be automatically controlled so as to adjust the data of the center 200a of the cross mark 200 to the position of (−Xs, 0). In this case, the data of the center 200a is obtained by the image recognizing section 187.

When the image area of the first image is adjusted to the appropriate position and the second image has an inclination shown in FIG. 22A namely has rotational deviation caused in the γ direction, the CCD adjustment motor 143 is driven. Upon driving the CCD adjustment motor 143, the second CCD 103 is rotated in the γ direction such as shown in FIG. 18. In virtue of this, the cross mark 200 caught in the second image data 220 is rotated such as shown in FIG. 22B to adjust the rotational deviation in the γ direction.

After adjusting the rotational deviation in the r direction, the second image data 220 is transferred to the image recognizing section 187 in which the cross mark 200 is recognized from the second image data 220 by using a pattern matching method to find a position of the center 200a of the cross mark 200. The image recognizing section 187 having found the position of the center 200a obtains deviation amounts X1 and Y1 between a position of (Xs, 0), which is shifted from the center 222a of the clip area 222 by Xs in the X direction, and the center 200a of the cross mark 200. At this time, the center 222a of the clip area 222 is defined as (0, 0). The deviation amounts X1 and Y1 obtained by the image recognizing section 187 are sent to the clip operating section 188.

The clip operating section 188 into which the deviation amounts X1 and Y1 have been inputted reads the clip-position data of the clip area 222 from the flash memory 117 of the multi-eye image pickup device 2. The clip-position data is stored, for example, as deviation amounts X0 and Y0 existing between an upper-left corner 220a of the second image data 220 and an upper-left corner 222b of the clip area 222. On the basis of the respective values, the clip operating section 188 updates the clip-position data of the clip area 222 by calculating expressions of X2=X0−X1 and Y2=Y0−Y1 to adjust the position of the clip area 222. Incidentally, the updated clip-position data X2 and Y2 are written in the flash memory 117 again.

The adjusted clip area 222 is as shown in FIG. 22C. It will be understood that the center 200a of the cross mark 200 caught in the second image moves to the position of (Xs, 0) and the second image is adjusted to an appropriate image area having no positional deviation except for the parallax, similarly to the first image. After writing the clip-position data X2 and Y2 in the flash memory 117, the multi-eye image pickup device 2 reads the adjusted position data from the flash memory 117 when the image-signal processing circuit 116 performs the clipping process. Thus, the respective images having no positional deviation except for the parallax are supplied to the external equipments.

In the above embodiment, the flash memory 117 is used as a nonvolatile memory. However, this is not exclusive. Another nonvolatile memory of EEPROM, for instance, may be used.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A multi-eye image pickup device comprising:
   a plurality of imaging optical systems respectively having a taking lens and an image sensor on which a subject image is formed by said taking lens;
   a case for holding said imaging optical systems at a predetermined interval;
   an image clipper for clipping a portion, which corresponds to a clip area predetermined every shooting frame of the respective image sensors, from said shooting frame;
   a memory for storing clip-position data representing a position of said clip area situated on said shooting frame; and
   a mechanism for adjusting said interval of said imaging optical systems comprising:
      first and second mounting plates to which the first and second imaging optical systems are respectively attached;
      first and second movable members with which said first and second mounting plates respectively connect, a female helicoid being formed on an inner surface of the respective movable members; and
      an adjustment shaft on which first and second male helicoids meshing with said female helicoids are formed, said adjustment shaft being rotated to adjust said interval of said imaging optical systems via said movable members and said mounting plates,
   wherein said clip-position data stored in said memory represents a region predetermined around a location, which corresponds to a reference point shifted in a faraway direction relative to a predetermined subject position.

2. A multi-eye image pickup device according to claim 1, wherein said memory stores said clip-position data of said clip area rotated on the basis of a rotational shift amount of said shooting frame turning around an optical axis of said taking lens.

3. A multi-eye image pickup device according to claim 1, wherein directions of said first and second male helicoids are reversed to each other.

4. A multi-eye image pickup device according to claim 3, wherein one end of said adjustment shaft is provided with a knob, which is externally operable.

5. A multi-eye image pickup device according to claim 1, wherein said clip-position data stored in said memory represents a location, which corresponds to a reference point shifted in a faraway direction relative to a predetermined subject position, and said image clipper clips said clip area around the location represented by said clip-position data.

6. A multi-eye image pickup device according to claim 5, wherein said memory stores a rotational shift amount of said shooting frame, which turns around an optical axis of said taking lens, relative to the respective imaging optical systems, and said image clipper clips said clip area rotated in accordance with the corresponding shift amount stored in said memory.

7. A multi-eye image pickup device according to claim 5, further comprising:
   a mechanism for adjusting said interval of said imaging optical systems.

8. A multi-eye image pickup device according to claim 7, wherein said mechanism comprises:
   first and second mounting plates to which the first and second imaging optical systems are respectively attached;
   first and second movable members with which said first and second mounting plates respectively connect, a female helicoid being formed on an inner surface of the respective movable members; and
   an adjustment shaft on which first and second male helicoids meshing with said female helicoids are formed, said adjustment shaft being rotated to adjust said interval of said imaging optical systems via said movable members and said mounting plates.

9. A multi-eye image pickup device according to claim 8, wherein directions of said first and second male helicoids are reversed to each other.

10. A multi-eye image pickup device according to claim 9, wherein one end of said adjustment shaft is provided with a knob, which is externally operable.

11. An adjusting method for a multi-eye image pickup device including a plurality of imaging optical systems respectively having a taking lens and an image sensor on which a subject image is formed by said taking lens, with each imaging optical system attached to a respective mounting plate with each mounting plate having a respective movable member connected thereto with a female helicoid formed on an inner surface of each movable member, and the image pickup device includes an adjustment shaft on which a plurality of male helicoids that mesh with the plurality of female helicoids are formed, said imaging optical systems being disposed at a predetermined interval, said adjusting method comprising the steps of:
   shooting a target, which is disposed so as to be shifted in a faraway direction relative to a predetermined subject position, by using said imaging optical systems;
   measuring a position of said target located within a shooting frame, with respect to each of said imaging optical systems;
   determining either of the position of said target and a clip area whose center is the position of said target;
   setting the determined position of said target and the determined clip area to said multi-eye image pickup device; and
   adjusting the interval between said plurality of imaging optical systems via said moveable members and said mounting plates by rotating the adjustment shaft.

12. An adjusting method according to claim 11, further comprising the steps of:
   analyzing a rotational shift amount of said shooting frame, which turns around an optical axis of said taking lens, on the basis of a rotational amount of the shot target with respect to each of the imaging optical systems;
   determining either of said shift amount and a clip direction of said clip area corresponding to said shift amount; and
   setting the determined shift amount and clip direction to said multi-eye image pickup device.

13. An image-area adjusting system for a multi-eye image pickup device including a plurality of imaging optical systems respectively having a taking lens and an image sensor on which a subject image is formed by said taking lens, said imaging optical systems being disposed at a predetermined interval, and said multi-eye image pickup device further including an image clipper and a nonvolatile memory, wherein the image clipper clips a portion, which corresponds to a clip area predetermined every shooting frame of the respective image sensors, from the shooting frame and the nonvolatile memory stores clip-position data representing a position of said clip area situated on said shooting frame, said image-area adjusting system comprising:
   a chart on which an adjustment image is drawn for adjusting an image area of said imaging optical system;
   an adjustment stage for moving said multi-eye image pickup device, which is fixed in a state that said imaging optical systems confront said adjustment image, in vertical and horizontal directions, and for rotating said multi-eye image pickup device around an axis extending toward said adjustment image, said adjustment stage making an appropriate position, which is shifted from a central position of said clip area by parallax of said imaging optical systems, coincide with a reference position of said adjustment image with respect to the first imaging optical system; and
   an adjusting device being capable of intercommunicating with said multi-eye image pickup device, said adjusting device recognizing said adjustment image from said shooting frame of the second imaging optical system to obtain reference-position data representing a deviation amount between the appropriate position of the second imaging optical system and the reference position of said adjustment image in a state that said appropriate position of the first imaging optical system coincides with said reference position of said adjustment image, and said adjusting device updating said clip-position data on the basis of the reference-position data so as to make the appropriate position of the second imaging optical system coincide with the reference position of said adjustment image, and then said adjusting device overwriting the updated clip-position data in said nonvolatile memory.

14. An image-area adjusting system according to claim 13, wherein said multi-eye image pickup device includes a rotation-angle adjusting mechanism for adjusting a rotation angle of said image sensor around an optical axis thereof, and
   said adjustment stage includes a driver for driving said rotation-angle adjusting mechanism.

15. An adjusting device for a multi-eye image pickup device including a plurality of imaging optical systems respectively having a taking lens and an image sensor, a case for holding said imaging optical systems at a predetermined interval, an image clipper for clipping a portion, which corresponds to a clip area predetermined every shooting frame of the respective image sensors, from said shooting frame, and a nonvolatile memory for storing clip-position data representing a position of said clip area situated on said shooting frame, said adjusting device comprising:
   a communicating section for intercommunicating with said multi-eye image pickup device;
   an image recognizing section for recognizing an adjustment image, which is for adjusting an image area of said imaging optical systems, from said shooting frame when said multi-eye image pickup device shoots said adjustment image, said image recognizing section obtaining reference-position data representing a deviation amount between an appropriate position, which is shifted from a central position of said clip area by parallax of said imaging optical systems, and a reference position of said adjustment image with respect to each of said imaging optical systems; and a clip operating section for updating said clip-position data on the basis of said reference-position data so as to make said appropriate position coincide with said reference position, said clip operating section overwriting the updated clip-position data in said nonvolatile memory.

16. An image-area adjusting method for a multi-eye image pickup device including a plurality of imaging optical systems respectively having a taking lens and an image sensor, a case for holding said imaging optical systems at a predetermined interval, an image clipper for clipping a portion, which corresponds to a clip area predetermined every shooting frame of the respective image sensors, from said shooting frame, and a nonvolatile memory for storing clip-position data representing a position of said clip area situated on said shooting frame, said image-area adjusting method comprising the steps of:

fixing said multi-eye image pickup device to an adjustment stage in a state that said multi-eye image pickup device confronts a chart on which an adjustment image for adjusting an image area of said imaging optical system is drawn, said adjustment stage moving said multi-eye image pickup device in vertical and horizontal directions and rotating said multi-eye image pickup device around an axis extending toward said chart;

driving said adjustment stage to make an appropriate position, which is shifted from a central position of said clip area by parallax of said imaging optical systems, coincide with a reference position of said adjustment image with respect to the first imaging optical system;

recognizing said adjustment image from the shooting frame of the second imaging optical system;

obtaining reference-position data representing a deviation amount between the appropriate position of the second imaging optical system and the reference position of said adjustment image;

updating said clip-position data on the basis of the reference-position data so as to make the appropriate position of the second imaging optical system coincide with the reference position of said adjustment image; and overwriting the updated clip-position data in said nonvolatile memory.

* * * * *